(12) United States Patent
Fasola et al.

(10) Patent No.: US 12,447,992 B2
(45) Date of Patent: Oct. 21, 2025

(54) MULTIPLE SENSOR CALIBRATION IN AUTONOMOUS VEHICLES PERFORMED IN AN UNDEFINED ENVIRONMENT

(71) Applicant: GM Cruise Holdings LLC, San Francisco, CA (US)

(72) Inventors: Juan Fasola, San Francisco, CA (US); Ankit Rohatgi, Pacifica, CA (US); Zhonghua Ma, San Jose, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 179 days.

(21) Appl. No.: 17/859,058

(22) Filed: Jul. 7, 2022

(65) Prior Publication Data

US 2024/0010223 A1 Jan. 11, 2024

(51) Int. Cl.
*B60W 60/00* (2020.01)

(52) U.S. Cl.
CPC ..... *B60W 60/001* (2020.02); *B60W 2420/408* (2024.01); *B60W 2554/4041* (2020.02)

(58) Field of Classification Search
CPC ......... B60W 60/001; B60W 2420/408; B60W 2554/4041
See application file for complete search history.

(56) References Cited

U.S. PATENT DOCUMENTS

| | | | | |
|---|---|---|---|---|
| 10,775,488 | B2 * | 9/2020 | Bradley | G01S 7/4815 |
| 2018/0045536 | A1 * | 2/2018 | Kümmerle | G05D 1/0272 |
| 2018/0067198 | A1 * | 3/2018 | Valois | G01S 17/08 |
| 2019/0293756 | A1 * | 9/2019 | Blaes | G01S 7/4026 |
| 2020/0174131 | A1 * | 6/2020 | Chen | G01S 17/931 |
| 2020/0189608 | A1 * | 6/2020 | Braley | G01C 21/3407 |
| 2021/0003682 | A1 * | 1/2021 | Braley | G06N 3/08 |
| 2021/0172762 | A1 * | 6/2021 | Max | G01C 21/30 |
| 2021/0197854 | A1 * | 7/2021 | Grabe | B60W 50/0205 |
| 2021/0284184 | A1 * | 9/2021 | Song | B60W 60/001 |
| 2022/0177008 | A1 * | 6/2022 | Ma | B60W 60/00253 |
| 2022/0194412 | A1 * | 6/2022 | Zhang | B60W 60/001 |
| 2022/0227380 | A1 * | 7/2022 | Griffith | G06T 7/246 |
| 2022/0329715 | A1 * | 10/2022 | Wheeler | G05D 1/0088 |
| 2023/0089832 | A1 * | 3/2023 | Soon | G01S 7/40 701/23 |
| 2023/0150518 | A1 * | 5/2023 | Zhao | G01S 7/4972 701/1 |
| 2023/0227065 | A1 * | 7/2023 | Vora | B60W 60/0011 701/23 |
| 2024/0068819 | A1 * | 2/2024 | Holzknecht | G01S 13/86 |

* cited by examiner

*Primary Examiner* — Abdalla A Khaled
(74) *Attorney, Agent, or Firm* — CANTOR COLBURN LLP

(57) ABSTRACT

The subject technology is related to autonomous vehicles (AV) and, in particular, to calibrating multiple sensors of an AV in an undefined training area. An example method includes instructing the AV to pilot itself in an undefined training area subject to at least one constraint, wherein the AV is instructed to pilot itself along a path until the AV has overlapped at least a portion of the path, and at a location at which the AV has overlapped at least the portion of the path, determining that first returns from a previous LIDAR scan overlaps with second returns from a subsequent LIDAR scan taken when the AV has overlapped at least the portion of the path. Initially, the AV does not include a location reference to identify locations of objects in the undefined training area and a plurality of sensors of the AV are uncalibrated with respect to each other.

19 Claims, 13 Drawing Sheets

MULTIPLE SENSOR CALIBRATION IN AUTONOMOUS VEHICLES PERFORMED IN AN UNDEFINED ENVIRONMENT

TECHNICAL FIELD

The subject technology is related to autonomous vehicles and, in particular, to calibration of multiple sensors of an autonomous vehicle.

BACKGROUND

Autonomous vehicles are vehicles having computers and control systems that perform driving and navigation tasks that are conventionally performed by a human driver. As autonomous vehicle technologies continue to advance, ride-sharing services will increasingly utilize autonomous vehicles to improve service efficiency and safety. However, autonomous vehicles will be required to perform many of the functions that are conventionally performed by human drivers, such as avoiding dangerous or difficult routes, and performing other navigation and routing tasks necessary to provide safe and efficient transportation. Such tasks may require the collection and processing of large quantities of data disposed on the autonomous vehicle.

BRIEF DESCRIPTION OF THE DRAWINGS

The embodiments herein may be better understood by referring to the following description in conjunction with the accompanying drawings in which like reference numerals indicate identically or functionally similar elements, of which.

DETAILED DESCRIPTION

Figure 1:
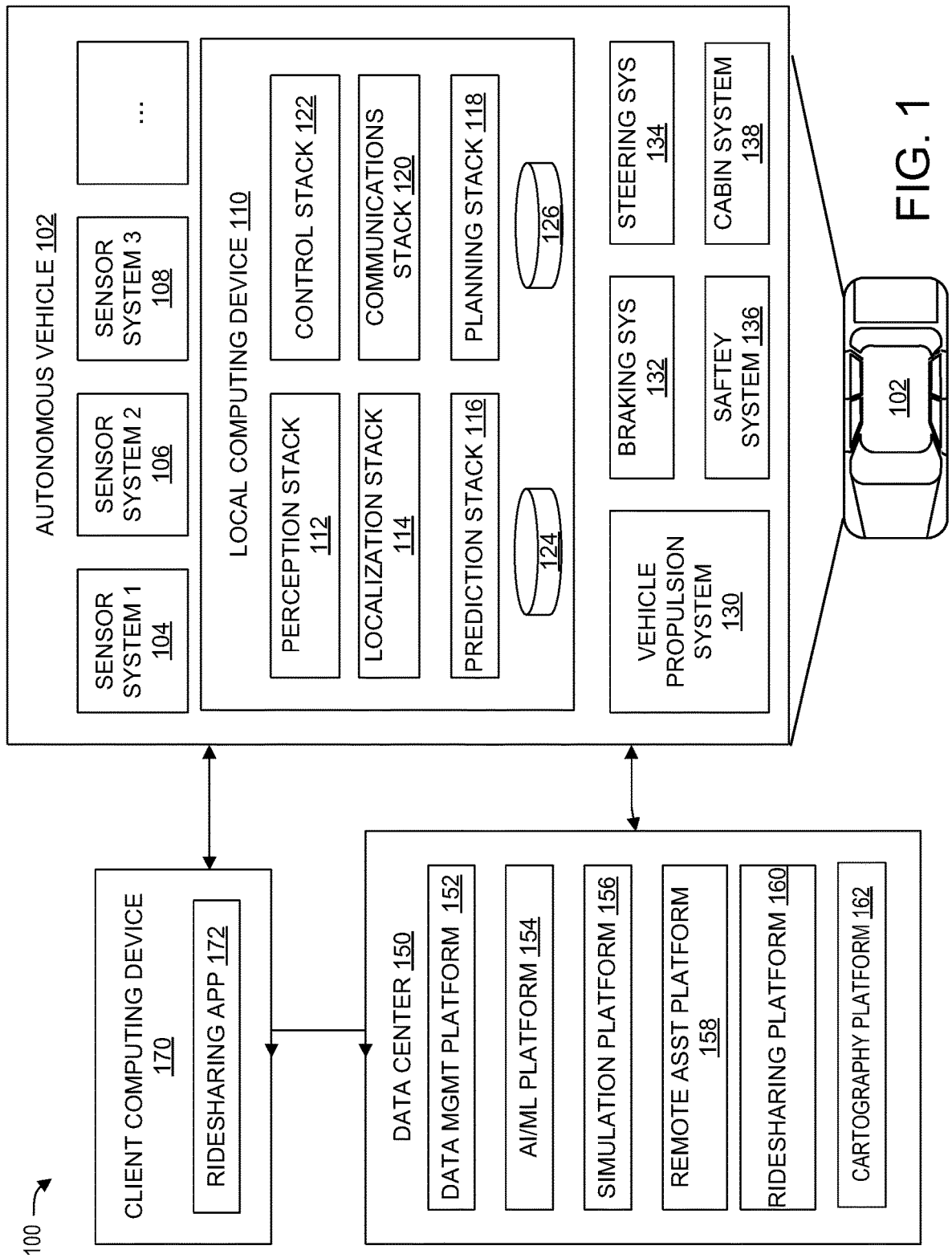
FIG. 1 illustrates an example of an autonomous vehicle (AV) management system according to an example of the instant disclosure.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

An autonomous vehicle (AV) includes a control system that controls various functions that are conventionally performed by a human driver, such as perception of objects in the environment, tracking of object movement in the environment, planning the movement of the AV based on object movement, and controlling navigation functions of the AV (e.g., acceleration, braking, turning, etc.). To achieve these functions, an AV includes different sensors with different modalities such as light detection and ranging (LIDAR), radar, image sensors, wheel encoders, and time of flight (ToF) sensors. When the AV is manufactured, these sensors should be calibrated to address tolerances and slight discrepancies based on each sensor's position, orientation, and other parameters. Aligning each sensor with respect to other sensors enhances measurement accuracy and improves the AV's ability to understand the environment accurately, which is necessary for safely operating the AV in an unknown environment.

One technique to calibrate sensors of an AV uses a dynamic calibration scene with an automated turntable or carousel system that simulates various measurements. The automated turntable or carousel system dynamically simulates various objects and compares results to reference values to align various sensor calibrations with respect to each other. However, the automated turntables systems require dedicated infrastructure such as real estate, targets, and so forth.

The disclosed technology proposes a technique for calibrating an AV in an undefined training area. An undefined training area is a public or private location that the AV does not have any knowledge of and includes suitable environmental features and space to allow the AV to navigate and calibrate the sensors using various movements in the real-world environment. The undefined training area is one that has one or more undefined features. Unlike the turntable environment, where the location of various targets and even the slope of the ground is known and defined, the undefined environment can have any number of undefined attributes. For example, the undefined environment could be a parking lot where cars may park or move while the AV is attempting to calibrate its sensors. The slope of the parking lot may not be uniform, and the slope(s) in the parking lot might not be known. The concept behind an undefined training area is that the AV can calibrate its sensors in almost any environment.

As the calibration of the sensors improves, for example, by a determined measurement tolerance between two different sensors, the AV can gradually increase confidence in the calibration. As the calibration confidence increases, the AV may be permitted to make more complex maneuvers to navigate within the environment at low speeds. In one aspect, the AV can maneuver in a loop to perform calibration of sensors that returns to a starting point or a previously traversed location of the AV.

A 'loop' as referred to herein denotes the concept that an AV will drive approximately over at least one point off its path that it has previously driven. A loop does not require any particular shape or distance.

By completing a loop, the AV can reference sensor data throughout the movement and identify calibration deficiencies and continue to improve the calibration. In some aspects, a semi-structured calibration process can be implemented, with the AV performing a series of basic maneuvers to provide a baseline calibration, and then the AV can perform a loop in the undefined training area that is predetermined and specific measurements of objects can be performed to ensure that the sensor calibration is suitable.

Once the sensors of the AV are deemed suitably accurate for low-speed maneuvers in the training area, the AV can be permitted to navigate open roads, but with limitations. In some aspects, the navigation of the open roads provides data diversity and the AV can continue to refine the sensors' calibrations based on open road navigation while removing restrictions as confidence in the sensors and calibrations of the sensors improve.

Figure 2:
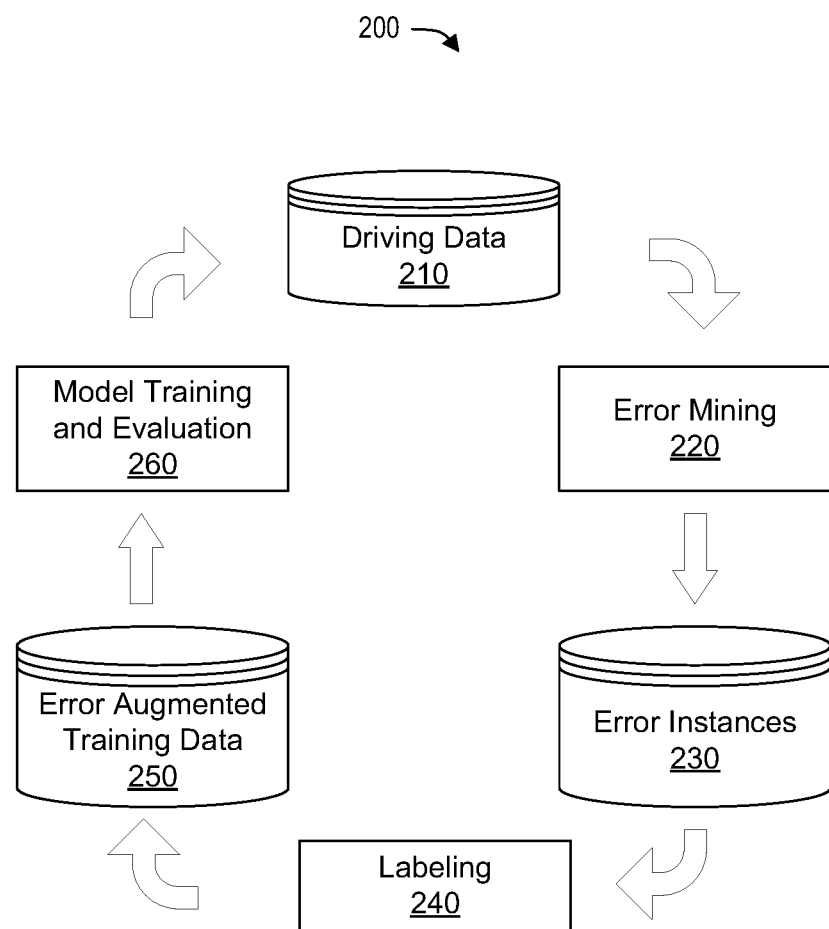
FIG. 2 illustrates an example diagram of a Continuous Learning Machine (CLM) for resolving uncommon scenarios in an AV according to an example of the instant disclosure.
Figure 3:
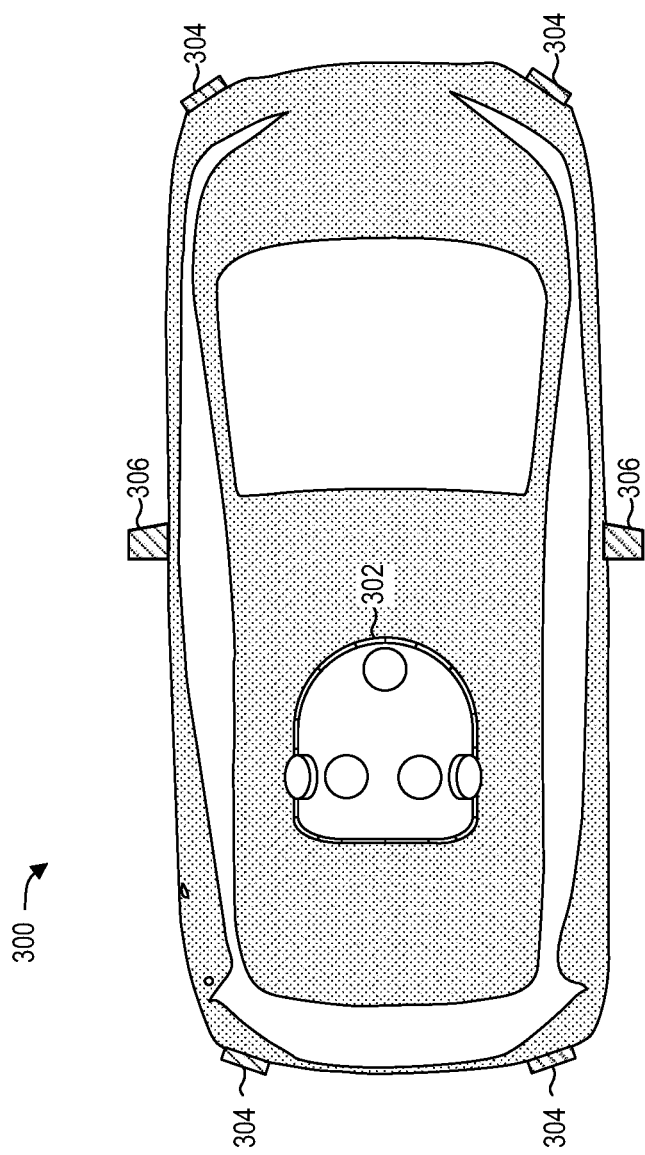
FIG. 3 illustrates a top-down perspective view of an AV and the positioning of different sensors that are fixed to the AV in accordance with some aspects
Figure 4:
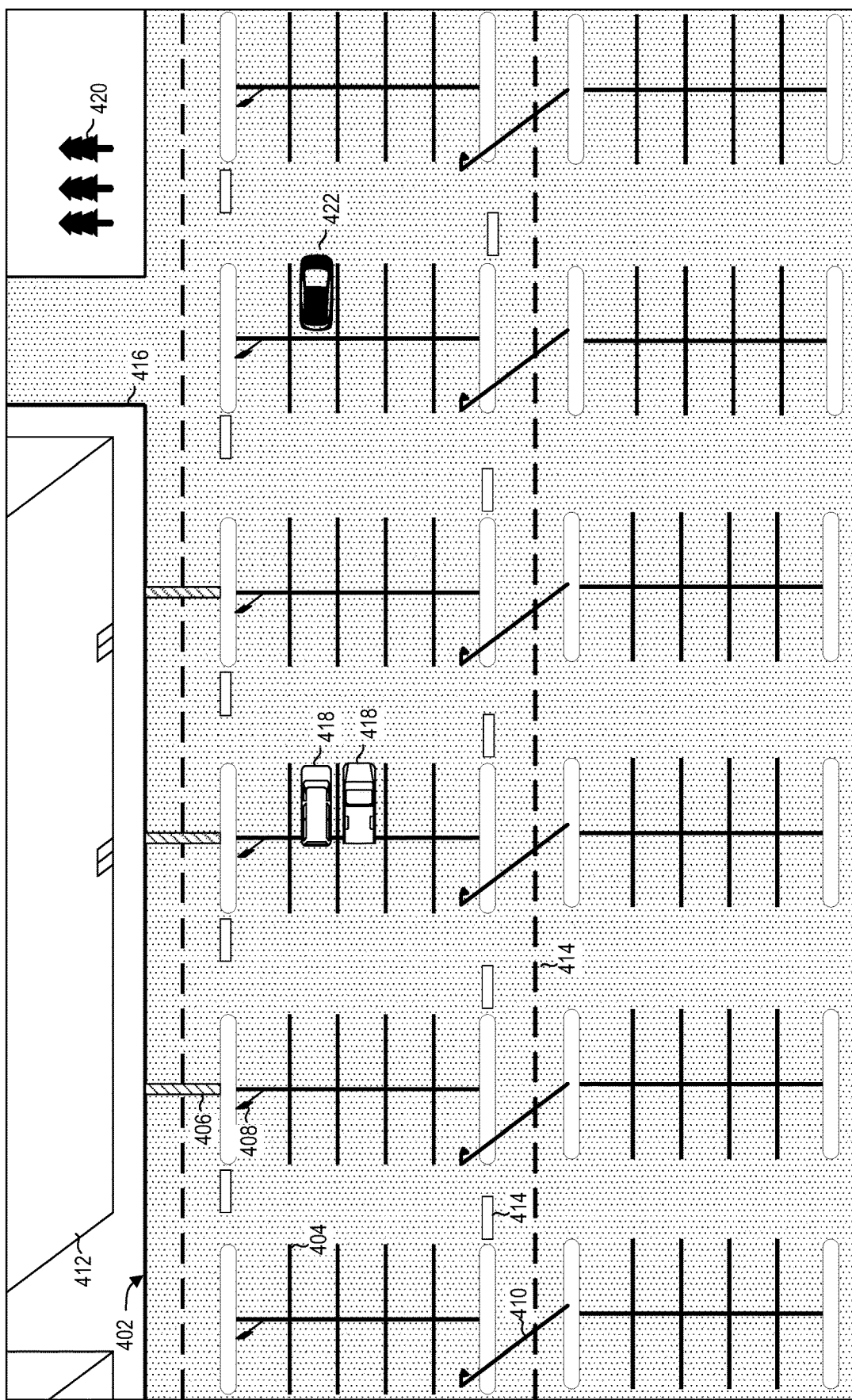
FIG. 4 illustrates an example of an unstructured training area for an AV to perform a structured calibration process in accordance with some aspects.
Figure 5:
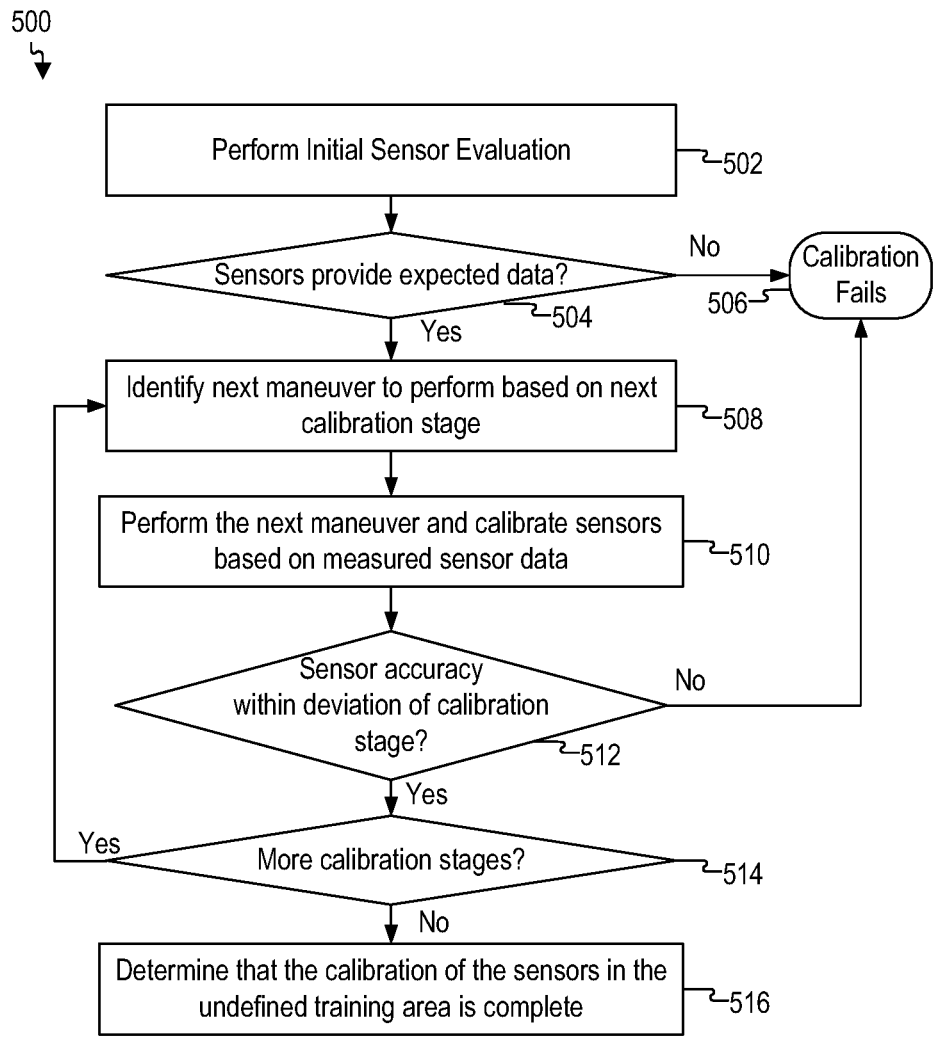
FIG. 5 illustrates a flowchart of a process to perform training of an AV in an undefined training area in accordance with some aspects.
Figure 6:
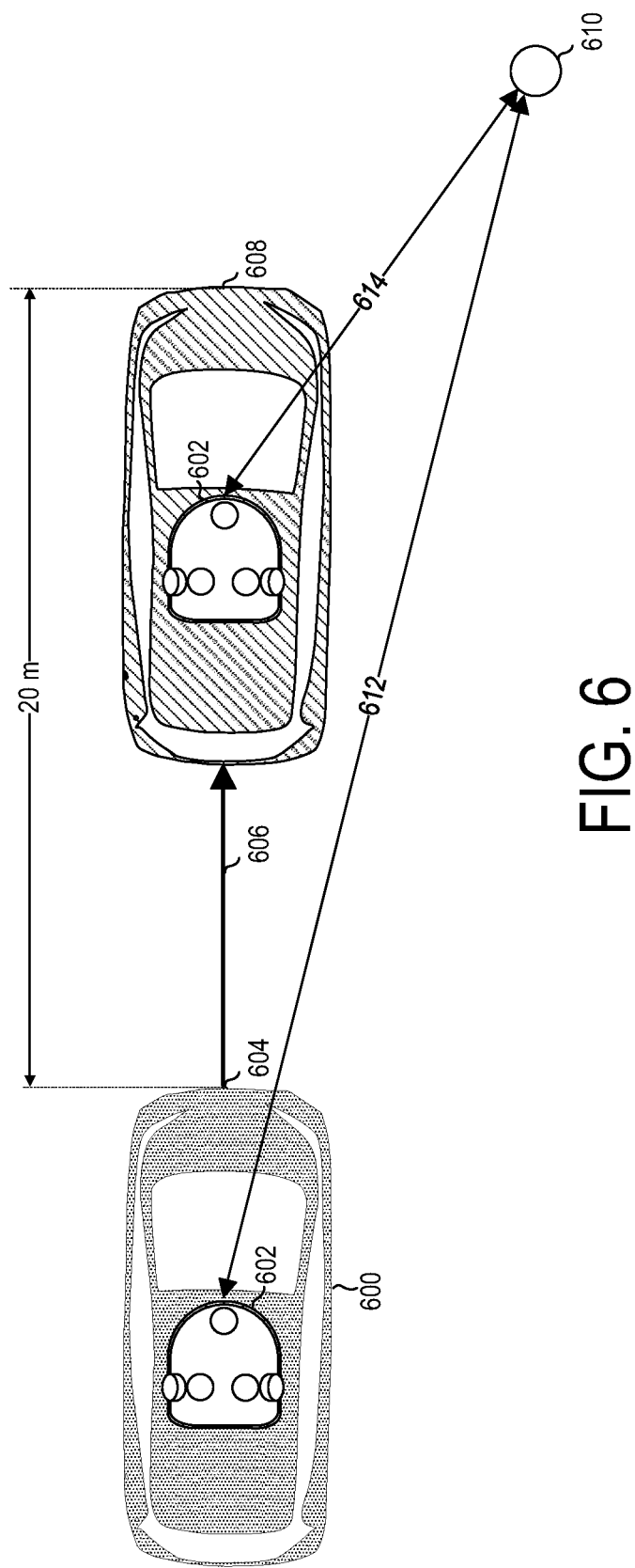
FIG. 6 illustrates an example of a linear movement that can be performed by an AV during sensor calibration in accordance with some aspects.
Figure 7:
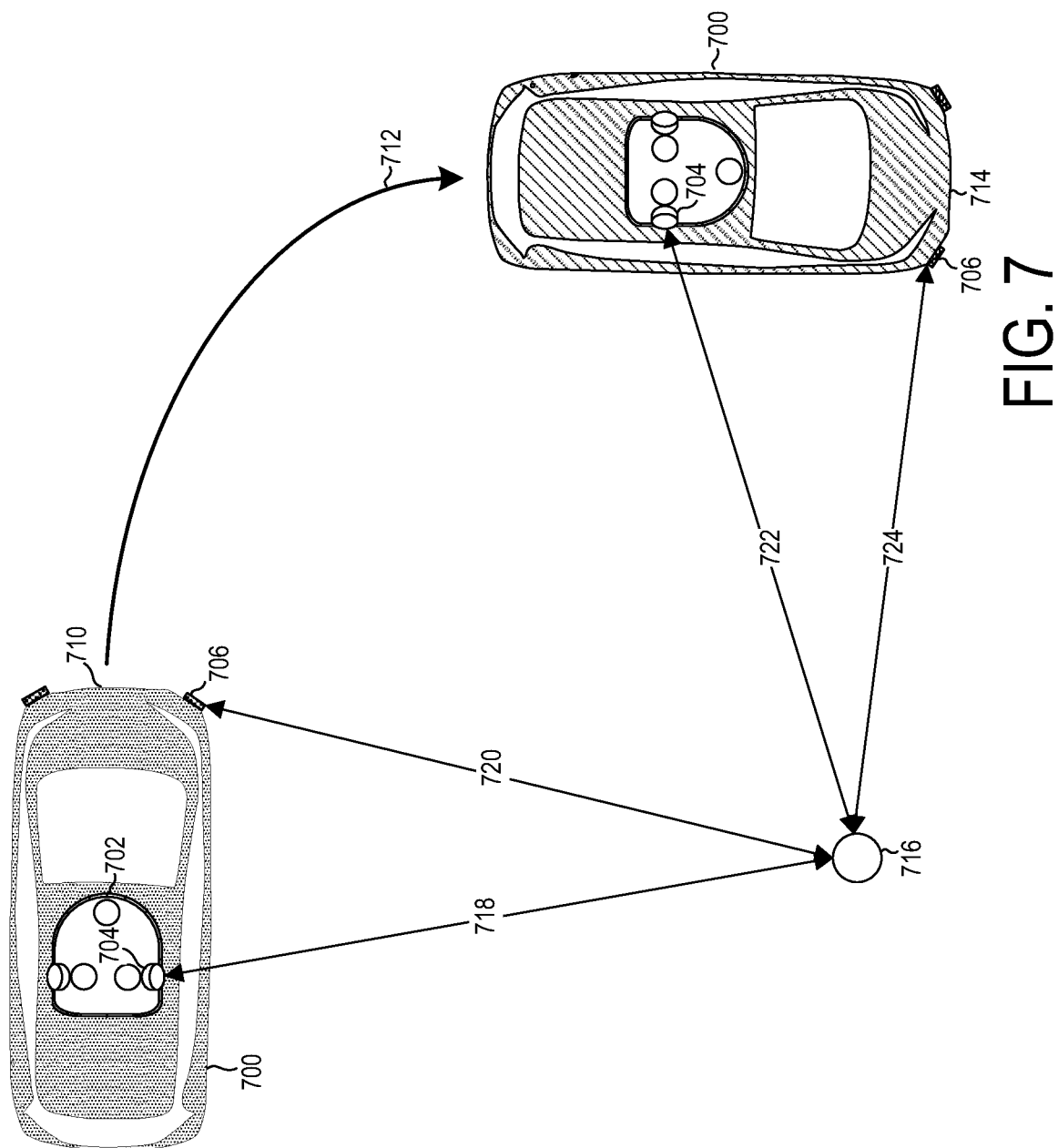
FIG. 7 illustrates an example of a non-linear movement that can be performed by an AV for various sensor calibrations in accordance with some aspects.
Figure 8:
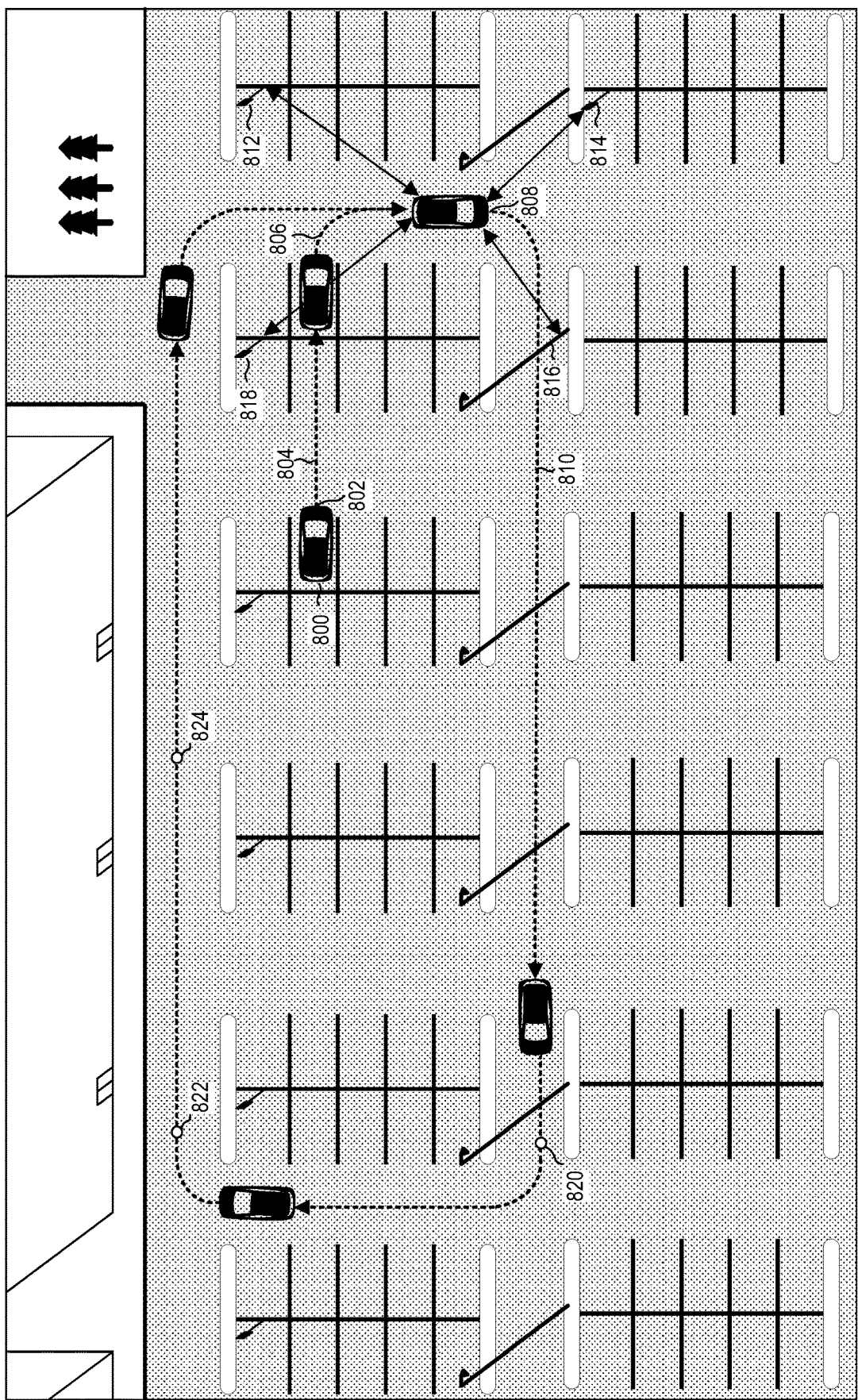
FIG. 8 illustrates an example of a loop movement in an undefined training area that can be performed by an AV for various sensor calibrations in accordance with some aspects.
Figure 9:
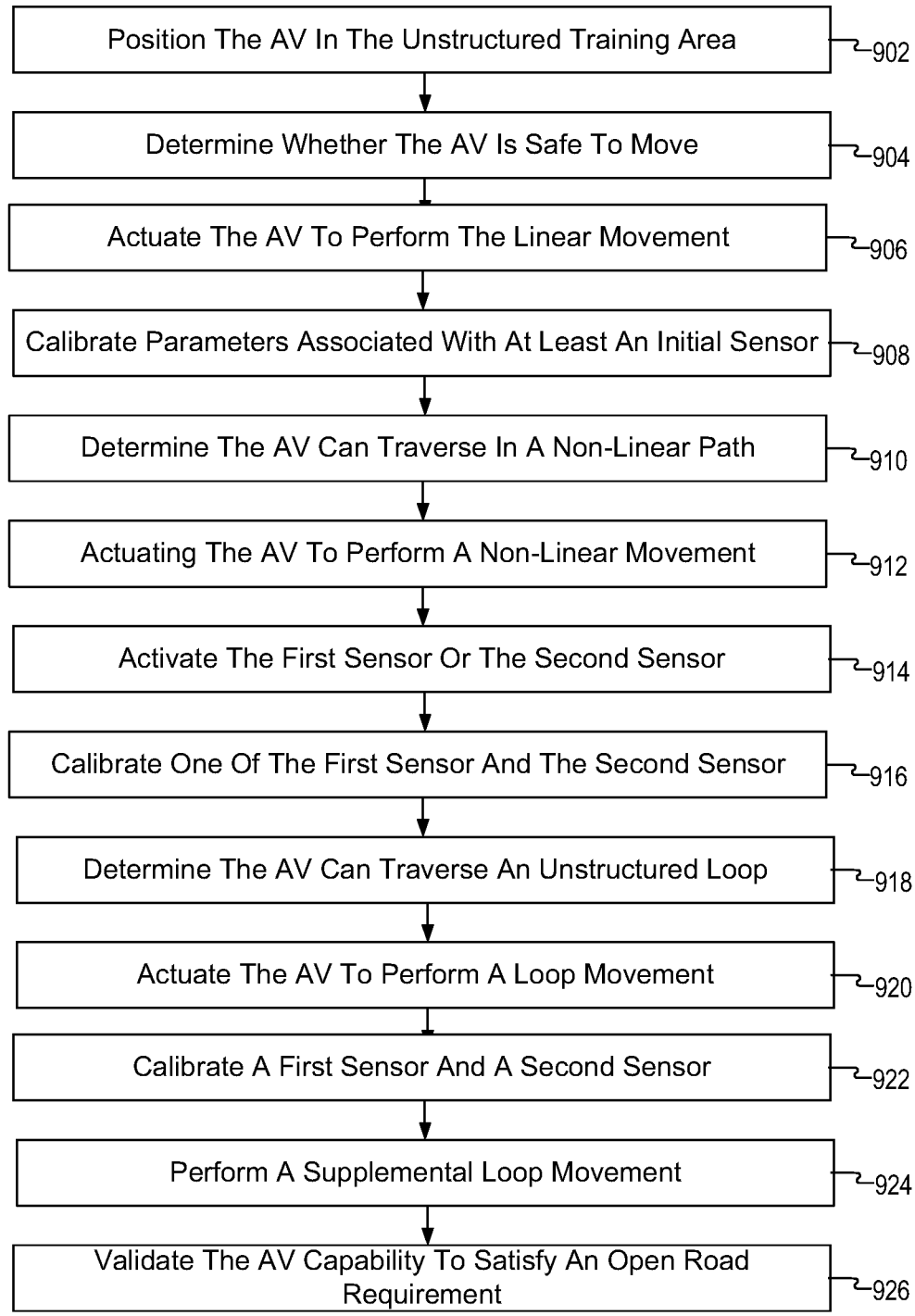
FIG. 9 illustrates an example method for calibrating multiple sensors of an AV in an undefined training area in accordance with some aspects.
Figure 10:
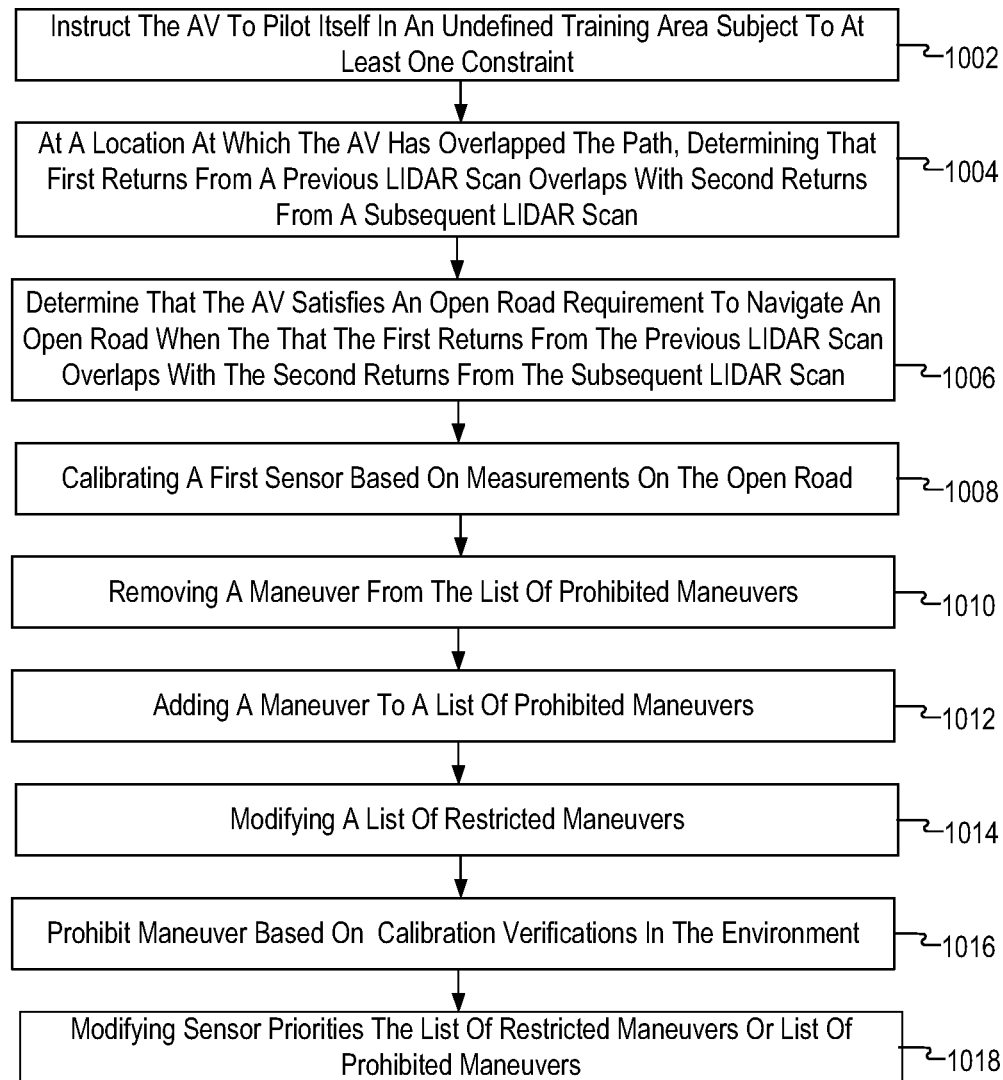
FIG. 10 illustrates an example method for open road calibration in accordance with some aspects.

A description of an AV management system and a continual learning machine (CLM) for the AV management system, as illustrated in FIGS. 1 and 2, are first disclosed herein. FIG. 3 illustrate an AV and the various sensors that may need to be calibrated to safely operate the AV. FIG. 4 illustrates an example undefined training area for calibrating multiple sensors of an AV without any seeded information and FIG. 5 is a block diagram of a method to perform multiple sensor calibration in the undefined training area. FIGS. 6, 7, and 8 are conceptual diagrams that illustrate various movements that AV can make during the multiple sensor calibration in the undefined training area. FIG. 9 is a flowchart of another method to perform multiple sensor calibration in the undefined training area and FIG. 10 is a flowchart of a method to remove open road constraints when an AV is trained in an undefined training area. FIGS. 11, 12, 13, and 14 are flowcharts of methods to calibrate various sensor combinations. The discussion then concludes with a brief description of example devices, as illustrated in FIG. 15. These variations shall be described herein as the various embodiments are set forth. The disclosure now turns to FIG. 1.

FIG. 1 illustrates an example of an AV management system 100. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include different types of sensors and can be arranged about the AV 102. For instance, the sensor systems 104-108 can comprise Inertial Measurement Units (IMUs), cameras (e.g., still image cameras, video cameras, etc.), light sensors (e.g., LIDAR systems, ambient light sensors, infrared sensors, etc.), RADAR systems, global positioning system (GPS) receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other embodiments may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some embodiments, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can additionally include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a prediction stack 116, a planning stack 118, a communications stack 120, a control stack 122, an AV operational database 124, and a high definition (HD) geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can also identify environmental uncertainties, such as where to look for moving objects, flag areas that may be obscured or blocked from view, and so forth. In some embodiments, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.). In some examples, the perception stack can also perceive environmental conditions of the AV 102 such as lighting and weather conditions to facilitate perception tasks and other tasks that consider the environmental conditions such as raining, snow, poor visibility in the human visibility spectrum, and the like.

The mapping and localization stack 114 can determine the AV's position and orientation (pose) using different methods from multiple systems (e.g., GPS, IMUs, cameras, LIDAR, RADAR, ultrasonic sensors, the HD geospatial database 126, etc.). For example, in some embodiments, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources. In some examples, the mapping and localization stack 114 may also receive the environmental conditions associated with the AV 102 to facilitate the determination of the AV's position and orientation.

The prediction stack 116 can receive information from the localization stack 114 and objects identified by the perception stack 112 and predict a future path for the objects. In some embodiments, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

The planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communication stack 120 can transmit and receive signals between the various stacks and other components of the AV 102 and between the AV 102, the data center 150, the client computing device 170, and other remote systems. The communication stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps and related data of the streets upon which the AV 102 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some embodiments, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can be a private cloud (e.g., an enterprise network, a co-location provider network, etc.), a public cloud (e.g., an IaaS network, a PaaS network, a SaaS network, or other CSP network), a hybrid cloud, a multi-cloud, and so forth. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ridesharing platform 160, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structured (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, the cartography platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, the cartography platform 162, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from the cartography platform 162; modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system, including a server, desktop computer, laptop, tablet, smartphone, smart wearable device (e.g., smartwatch, smart eyeglasses or other Head-Mounted Display (HMD), smart ear pods, or other smart in-ear, on-ear, or over-ear device, etc.), gaming system, or other general purpose computing device for accessing the ridesharing application 172. The client computing device 170 can be a customer's mobile computing device or a computing device integrated with the AV 102 (e.g., the local computing device 110). The ridesharing platform 160 can receive requests to pick up or drop off from the ridesharing application 172 and dispatch the AV 102 for the trip.

FIG. 2 illustrates an example diagram of a CLM 200 that solves uncommon scenarios in a rank-frequency distribution, which may be referred to long-tail prediction problem, in an AV in accordance with some examples. The CLM 200 is a continual loop that iterates and improves based on continual feedback to learn and resolve driving situations experienced by the AV.

The CLM 200 begins with a fleet of AVs that are outfitted with sensors to record a real-world driving scene. In some cases, the fleet of AVs is situated in a suitable environment that represents challenging and diverse situations such as an urban environment to provide more learning opportunities. The AVs record the driving situations into a collection of driving data 210.

The CLM 200 includes an error mining 220 to mine for errors and uses active learning to automatically identify error cases and scenarios having a significant difference between prediction and reality, which are added to a dataset of error instances 230. The error instances are long-tail scenarios that are uncommon and provide rich examples for simulation and training. The error instances 230 store high-value data and prevent storing datasets with situations that are easily resolved.

The CLM 200 also implements a labeling function 240 that includes both automated and manual data annotation of data that is stored in error augmented training data 250 and used for future prediction. The automated data annotation is performed by an ML labeling annotator that uses a neural network trained to identify and label error scenarios in the datasets. Using the ML labeling annotator enables significant scale, cost, and speed improvements that allow the CLM 200 to cover mores scenario of the long tail. The labeling function 240 also includes functionality to allow a human annotator to supplement the ML labeling function. By having both an automated ML labeling function and a manual (human) labeling annotator, the CLM 200 can be populated with dense and accurate datasets for prediction.

The final step of the CLM 200 is model training and evaluation 260. A new model (e.g., a neural network) is trained based on the error augmented training data 250 and the new model is tested extensively using various techniques to ensure that the new model exceeds the performance of the previous model and generalizes well to the nearly infinite variety of scenarios found in the various datasets. The model can also be simulated in a virtual environment and analyzed for performance. Once the new model has been accurately tested, the new model can be deployed in an AV to record driving data 210. The CLM 200 is a continual feedback loop that provides continued growth and learning to provide accurate models for an AV to implement.

FIG. 3 illustrates a top-down perspective view of an AV 300 and the positioning of different sensors that are fixed to the AV in accordance with some aspects. In one aspect, the AV includes a sensor array 302 that is mounted to a roof of the AV and is connected to an autonomous driver system controller (ADSC) within the AV. The sensor array 302 includes a plurality of sensors that are oriented in different directions and may be oriented differently. For example, the sensor array 302 includes five different LIDAR sensors, with one LIDAR sensor configured to monitor a full 360° scene, and the remaining four are configured to monitor a fixed quadrant (e.g., front-left, front-right, back-left, back-right) associated with the vehicle. The sensor array 302 can also include a plurality of image sensors to capture images, radars configured to detect objects using electromagnetic energy, thermal image cameras, ToF sensors, and so forth.

The AV 300 may also include integral sensors 304 that are integrated into the AV 300 at different positions to provide additional information. For example, the AV 300 may include integral sensors 304 positioned at each corner of the AV 300. The integral sensors 304 can also include a plurality of different types of sensors, such as a ToF sensor, an image sensor, and so forth.

In one aspect, the AV 300 can include a sensor such as an articulating radar 306 that protrudes from the AV 300 such as in a location that would correspond to a side view mirror in an automobile. In one aspect, the articulating radar 306 can be a long-range radar (LRR), which is a directional radar that has a longer detection range at the expense of a limited field of view (FOV). The articulating radar 306 can dynamically rotate to allow the LRR to dynamically monitor different areas at distance during maneuvers and allows the AV 300 to perceive objects within the environment better than a human driver.

During a maneuver, the articulating radar 306 may be configured to rotate to monitor different areas as the orientation and position of the AV 300 change during the maneuver. For example, during an unprotected left turn (e.g., when oncoming traffic can have the right-of-way), the articulating radar 306 can continue to monitor oncoming traffic by rotating as the AV 300 turns and another articulating radar 306 can monitor the target destination to ensure that an object (e.g., a person) does not obstruct the intended path of the AV 300.

Because the sensors are located at different positions, a calibration process is provided to address any tolerances and variations associated with the sensors. A small error at the sensor can have large downstream effects and cause the AV 300 to not be confident in the location of objects within the environment. An undefined training area is proposed because suitable landmarks and objects may already be present. For example, suitable landmarks can be perceived by different sensors. For example, a LIDAR sensor and a radar cannot detect lane markings and other color-based differences while an image sensor will be able to identify these features. An image sensor cannot accurately detect a distance to an object in the scene, but a LIDAR, radar, or ToF sensor identifies distances to objects in the environment.

An illustrative example of an undefined training area is a parking lot that has significant landmarks and other objects. For example, landmarks can include objects in the environment such as lights, signs on a post, a business façade, other vehicles, curbs, lane markings, parking spot markings, vegetation, and other traffic-related information. The undefined training area is one that has one or more undefined features. Unlike the turntable environment, where the location of various targets and even the slope of the ground is known and defined, the undefined environment can have any number of undefined attributes. The concept behind an undefined training area is that the AV can calibrate it sensors in almost any environment.

FIG. 4 illustrates an example of an undefined training area 400 for an AV to perform a structured calibration process in accordance with some aspects. The undefined training area 400 includes a parking lot 402 with various demarcations such as parking spot markings 404, crosswalk indicators 406, parking signs 408, light fixtures 410, a business façade 412, and traffic markings 414. Other obstacles in the sensor array 302 that can be detected include curbs 416, other vehicles 418, and vegetation 420.

Based on the variety of objects in the environment, the undefined training area 400 may be a suitable environment for a calibration and training of an AV because the objects within the undefined training area 400 are correlated to objects that the AV will use for autonomous driving. In one aspect, the semi-structured training begins by placing an AV 422 within the parking lot 402 without any situational awareness. For example, the AV 422 may not be provided a map to correlate measurements.

FIG. 5 illustrates a flowchart of a process 500 to perform training of an AV in an undefined training area in accordance with some aspects. The process 500 begins by placing the AV in an undefined training area such as the parking lot 402. In this aspect, the sensors of the AV are not calibrated with respect to each other, and any seed data (e.g., a map) may be omitted. In some aspects, a map can be provided but is not necessary for calibration processes described herein. At block 502, process 500 can perform (e.g., by an AV) an initial sensor evaluation to ensure that the various sensors are working and providing expected data. For example, the AV activates each sensor to determine that the sensor is operational. If the sensor can provide information, the AV may activate the sensor to request information and determine if the requested information corresponds to the expected information. For example, if an image sensor is mounted upside down, the AV can determine that the image sensor is not providing the expected data. In some cases, the incorrect orientation of image sensor can be fixed using a software update to revise addresses when accessing the image sensor to cause the readout of the image sensor to output an image with a correct orientation, or instruct the sensor to correct the image by rotating the image. Some sensors may not be able to provide suitable information to determine if the sensor is operating as expected while the AV is stationary. For example, a wheel encoder operates and provides information while the wheel is rotating (e.g., the AV is moving) and the wheel encoder cannot provide information while the AV is stationary. In another example, an IMU sensor is configured to measure angular rotation, force, or displacement and does not provide any information while the AV is stationary.

If the sensors are not providing the expected data at block 504, the calibration may fail at block 506. For example, two different LIDAR sensors can provide different measurement information that indicates one of the LIDAR sensors is inaccurate. At block 506, when the calibration fails, all calibration processes are halted to allow an operating entity the opportunity to fix the sensor issue. If the sensors provide expected data at block 504, the process 500 may identify the next maneuver to perform based on the next calibration stage at block 508. In some aspects, there can be gated calibration stages that the AV must pass to continue to the next stage to validate the integrity of all sensors operating together. The gated calibration stages can be based on increasing complex maneuvers. In one illustrative example, a first calibration stage can be related to a linear movement of the AV, a second calibration stage can be related to a non-linear movement of the AV (e.g., a turn), and a third calibration stage can be related to a loop movement. Other calibration stages can exist, such as perform a left-turn loop, perform a right turn loop, drive on a road, increase speed, an unprotected turn, stop the AV, decrease speed, perform a figure eight, and so forth.

After the next calibration stage is identified, the process 500 can perform the next maneuver associated with the next calibration stage, record sensor data during the movement, and calibrate sensors based on measured sensor data at block 510. The sensor data is used to identify various differences associated with the recorded sensor data and allow the AV to compute parameters associated with each sensor to align each sensor in space and time. For example, measurements of the sensors may not necessarily be synchronized in time and the parameters may need to account for timing differences between sensors. The parameters may also be used to account for different positioning of the sensors based on manufacturing tolerances, alignment deviations, and other minor discrepancies that should be accounted for to ensure that sensor data is aligned in space to improve multi-sensor detection of objects in the environment. For example, a thermal image sensor may be used to identify that an object in the environment is a mammal and a LIDAR sensor may be used to identify the distance to that mammal. In the event that data from the LIDAR sensor and the thermal image sensor are not aligned, detection of the mammal in the environment can be compromised.

At block 512, the process 500 determines (e.g., by the AV) if the sensor accuracy is within a deviation of the calibration stage. The sensor accuracy may have a higher error range in earlier stages because simple maneuvers may be performed. For example, spatial alignment of LIDAR sensors may not accurate until an AV performs a non-linear movement and the tolerance associated with linear movement may be higher than the non-linear movement. In some aspects, the sensor accuracy is associated with sensors of the same type (e.g., LIDAR-LIDAR) or sensors of a different type (e.g., LIDAR-image sensor). If the sensor accuracy is not within a suitable deviation range of the calibration stage, the process 500 may proceed to block 506 where the calibration fails and calibration processes stop. In other aspects, the calibration process of a particular stage may be performed a fixed number of times (e.g., two) before determining that the calibration fails.

If the sensor accuracy is within the deviation of the calibration stage at block 512, the process 500 determines if there are any additional calibration stages at block 514. If additional calibration stages exist at block 514, the process 500 returns to block 508 to identify the next calibration stage.

In one illustrative example, a final calibration may be a loop to provide sufficient alignment of LIDAR sensors. Because the AV did not have any situational awareness (e.g., no map), the AV can calibrate the LIDAR sensors based on performing a loop. By returning to that same point, the AV is able to reference initial sensor measurements at that location and subsequent sensor measurements and identify any parameters that would cause drift. In some cases, the sensor is able to identify objects in the environments that were identified before performing the loop and identify those objects after performing the loop to determine if any of the objects are in different locations. Based on returning to the location, the AV can use multiple objects to triangulate its position and determine a distance to the objects within the environment, and can then validate whether the calibration of the various sensors is accurate. By returning to the location, the AV can establish a ground truth based on measurements before the loop and measurements after the loop. For example, a first LIDAR sensor can detect a position of a signpost, and after the loop, the first LIDAR sensor and a second LIDAR sensor can detect a position of the signpost. If the subsequent measurements of the signpost based on the calibration parameters do not deviate from the first measurement, the first LIDAR sensor and the second LIDAR sensor can be deemed to be calibrated with respect to each other. The calibration parameters can be used to align the various sensors so that measurement data from the various sensors is consistent and objects and movement within the environment is accurate. As described in detail below, the various sensors are calibrated with respect to each other to ensure that each sensor is providing consistent data to facilitate the AV's understanding of the environment. By aligning sensor features with respect to each other, sensor data from each sensor can be aggregated into a perceived scene to allow the AV to understand the environment based on multiple sensors.

If no additional calibration stages exist at block 514, the process 500 moves to block 516 and determines that the calibration of the sensors in the undefined training area is complete.

In some aspects, after calibration of the sensors in the undefined training area is complete, the AV can begin operation on open roads with at least one constraint. In one illustrative example, the AV can request permission from a command and control server and the command and control server can provide authorization. During open road navigations, the AV can include at least one constraint. A constraint can include a maneuver that is identified within one of a list of prohibited maneuvers or a list of restricted maneuvers. A list of prohibited maneuvers comprises various maneuvers that the AV is not ready for based on various factors such as data diversity, lack of confidence in the calibration based on high-speed navigation, and so forth. A list of restricted maneuvers comprises various maneuvers that may be performed in specific circumstances. A maneuver can be migrated from a list of prohibited maneuvers to a list of restricted maneuvers and vice-versa based on various determinations.

In some cases, a maneuver can be removed from the list of prohibited maneuvers or the list of restricted maneuvers based on a trigger or a condition. For example, an initial prohibited maneuver of the AV can be a maximum speed limit because the AV does not have sufficient data diversity and there is not sufficient confidence in long distance accuracy of the sensors. In that case, the AV can be restricted to a maximum speed until the AV has travelled a number of minutes (e.g., 20 minutes) or a distance (e.g., 15 miles) at a minimum speed that is less than the maximum speed. Once the AV has satisfied this condition, the AV can remove the identified maneuver (e.g., a maximum speed limit). Another example of a prohibited maneuver is an unprotected left turn, which may have a number of conditions or triggers that must be satisfied. For example, the articulating radars must be sufficient data diversity and must have an identified confidence based on various determinations before an unprotected left turn can be considered. Further, the unprotected left turn may be removed from the list of prohibited maneuvers after a minimum number of protected left turns have been performed by the AV. The command and control server can also grade various maneuvers such as a protected left turn to determine a quality of the protected left turn satisfies a criteria to be deemed a successful protected left turn.

In some case, the command and control server or the AV can be configured to continually monitor the calibration of the various sensors to determine the calibration parameters do not shift by a particular amount during AV navigation. The command and control server can also be configured to dynamically change the list of prohibited maneuvers and the list of restricted maneuvers based on various external factors. For example, the list of prohibited maneuvers can be dynamically changed from the command and control server in the event of snowfall. However, the command and control server can be aware of the quality of the snow or ice and can determine based on dry/wet quality of the snow which maneuvers to restrict or prohibit until the AV is deemed sufficiently capable of performing various maneuvers.

In other aspects, the command and control server can be configured to instruct the AV to demote or promote sensor priorities based on the various factors. In one aspect, an undesirable external force applied to a sensor can negatively affect its calibrations and may need to be demoted until it can be either fixed or recalibrated. In this case, the command and control server can identify that the calibration is no longer valid for this sensor and the sensor can be demoted measured data can either be weighted less or entirely discarded. For example, if an image sensor integrated into a bumper becomes misaligned due to an object striking the bumper, the command and control server can identify that the sensor becomes miscalibrated and does not correspond to a calibration parameter. The command and control server can store the various calibration parameters and identify that the objects have shifted. In some cases, the AV can request the previous calibration parameters and can then validate the previous calibration parameters with respect to current calibration parameters. In other cases, the command and control server can receive the calibration parameters based on open road navigation and determine that the calibrations (e.g., in the undefined training area) have shifted by an amount that indicates that the safety decisions of the AV could be compromised. In that case, the command and control server could determine that the AV should either navigate to a safe point so that the AV can be retrieved or return to the fleet management center.

In some aspects, the process 500 may provide initial calibration of sensors in a low-speed environment to ensure that the AV is accurately monitoring the environment. Once the sensors are deemed to have sufficient confidence, the AV is then permitted to begin navigating on open roads. In some aspects, the AV can have limited data diversity with respect to sensors when it begins operating on the open roads and the AV may also have operating constraints. For example, the AV may be configured to only perform protected left turns until the LIDAR sensors and radars have sufficient data diversity.

In some cases, the AV may be provided with a map and the AV can perform a similar self-calibrating procedure described in FIG. 5. In the case the AV is provided a map, the AV can detect known features in the map and the objects within the environment can be used to calibrate the various sensors based on measures within the map. For example, the AV can identify various environmental features (e.g., a light pole, a curb, a signpost) within the map and can scan the environment without moving to determine a distance to the various environmental features. For example, a LIDAR positioned to monitor a front-left area can identify a light pole, and based on the identified position of the light pole, an articulating radar on the left side of the AV can be calibrated to identify an encoder position (e.g., the rotational position) and a physical location of the articulating radar with respect to the LIDAR. Based on the distances to the various objects, a portion of the sensors can be calibrated without movement based on having a map that serves as a ground truth. The AV can continue calibrating the sensors based on a graduated series of moves as described above (e.g., a linear movement, a non-linear movement, etc.). In that case, the AV would not need to perform a loop because the map serves as a ground truth and provides enough context for the AV to calibrate the sensors to eliminate any drift.

FIG. 6 illustrates an example of a linear movement that can be performed by an AV 600 during sensor calibration in accordance with some aspects. In some aspects, the AV 600 includes a sensor array 602 mounted to a roof of the AV 600 and includes a number of sensors that should be calibrated with respect to each other. The AV 600 is positioned at a first location 604 and determines to move on a linear path 606 to a second location 608 while recording sensor data from at least some of the sensors in the sensor array 602, and other sensors that are not depicted such as a wheel encoder.

For example, the AV 600 determines to move a distance of 20 meters along the linear path 606 and at least a portion of the sensors can perceive or detect a static object 610 in the environment. In one aspect, the AV can determine an initial distance 612 to the static object 610 before the linear movement and a final distance 614 to the static object 610 after the linear movement. Based on the distance to the static object 610, the AV 600 can perform various calibrations and validate information such as the tolerance and accuracy of a wheel encoder. For example, because the static object 610 does not move and provides a fixed reference, measurement data from a LIDAR sensor can be cross-referenced to determine suitable parameters such as tolerance of a wheel encoder or an IMU sensor.

In some aspects, the calibration processes may be related to intra-sensor parameters, or parameters that only affect the parameter itself. For example, a tolerance associated with a wheel encoder is an intra-sensor parameter, or a parameter related to an orientation of a sensor (e.g., the sensor is angled 0.01° off-center). The calibration process may be related to inter-sensor parameters, such as the distance between the sensors. In some aspects, the mechanical position may be seed information for the calibration (e.g., initial calibration information), but manufacturing tolerances and other issues may cause sensors to be placed within a tolerance that can significantly impact measurements and affect AV operation. For example, if two different sensors place an object at different locations, the AV may not have confidence in that prediction, which affects how the AV navigates the environment because safety is a significant priority of the AV.

In some aspects, the calibration process can include calibrating multiple sensors of the same type or different types based on the perceived environment. For example, a front-left image sensor and a front-left LIDAR sensor may be calibrated together. The LIDAR sensors can also be calibrated together such as a full-sweep LIDAR sensor having 360° FOV can be calibrated with the front-left LIDAR sensor. In other aspects, a LIDAR sensor can be calibrated with a radar sensor, a ToF sensor can be calibrated with a LIDAR sensor or a radar sensor. In some aspects, a reference LIDAR can be used to perform initial calibrations to align all sensors with that single LIDAR, and then further calibrations can be performed with respect to other related sensors.

FIG. 7 illustrates an example of a non-linear movement that can be performed by an AV 700 for various sensor calibrations in accordance with some aspects. In some aspects, a sensor array 702 is mounted to a roof of the AV 700 and includes a number of sensors that should be calibrated with respect to each other. For example, the sensor array 702 includes a LIDAR sensor 704 that can be calibrated with respect to a front-right sensor 706 based on a non-linear movement of the AV 700. In some aspects, the front-right sensor 706 can be a LIDAR sensor, a ToF sensor, an image sensor, or a radar.

Initially, the AV is positioned at a first location 710 and determines to perform a non-linear movement 712 (e.g., a right turn) to move the AV to a second location 714 while recording data from the sensors (e.g., the LIDAR sensor 704 and the front-right sensor 706). A static object 716 may be perceivable by the LIDAR sensor 704 and the front-right sensor 706 for the duration of the non-linear movement 712.

While at the first location 710, the LIDAR sensor 704 can measure an initial distance 718 to the static object 716 and the front-right sensor 706 can measure an initial distance 720 to the initial distance 720. After the AV 700 has moved to the second location 714, the LIDAR sensor 704 can record a final distance 722 to the static object 716 and the LIDAR sensor 704 can record a final distance 724 to the static object 716.

In one illustrative example, the AV 700 can determine a transfer function between the LIDAR sensor 704 and the front-right sensor 706 based on a difference in the transformation from the initial location to the final location. For example, the AV 700 can determine a difference based on different frames of each sensor. For example, a first transformation associated with the static object 716 can be determined based on the changes between the initial distance 718 and the final distance 722 for the LIDAR sensor 704, and a second transformation associated with the static object 716 can be determined based on changes between the initial distance 720 and the final distance 724. Because the LIDAR sensor 704 has a larger radius and is positioned differently than the front-right sensor 706, the first transformation and the second transformation will be different. The AV 700 can determine a transfer function of the LIDAR sensor 704 with respect to the front-right sensor 706 based on a difference between the first transformation and the second transformation. In some aspects, the AV can use the transfer function of the LIDAR sensor 704 with respect to the front-right sensor 706 to determine calibration parameters associated with at least one of the LIDAR sensor 704 and the front-right sensor 706.

In another illustrative example, the transfer function between the LIDAR sensor 704 and the front-right sensor 706 can be computed based on mapping from one sensor into another sensor and aligning the sensor data between the sensors. For example, multiple frames of the LIDAR sensor 704 can be converged into a map using odometry data and the transfer function between the sensors, and then data of a frame or multiple frames from the front-right sensor 706 can be aligned with the map. Based on differences in features in the map and frames, the AV 700 can extrapolate a transfer function that accurately maps data from the front-right sensor 706 to correspond to the LIDAR sensor 704. Based on the map, the AV 700 can determine the position of the front-right sensor 706 with respect to the LIDAR sensor 704 and then identify corresponding calibrations parameters for the sensors.

In some aspects, the sensor-to-sensor calibration can also be performed using sensors with different modalities. For example, the front-right sensor 706 may be an image sensor and calibration parameters can be determined using a single frame or multiple frames from the LIDAR sensor 704 and the front-right sensor 706. In one illustrative example, the LIDAR sensor 704 and front-right sensor 706 may be seeded with projected calibration information that was provided at design time and the calibration process can fine-tune the calibration information for runtime calibration. In one aspect, based on the projected calibration information, the point cloud data from the LIDAR sensor 704 can be projected into an image from the front-right sensor 706. The edges of objects in the point cloud data can be identified based on depth discontinuities in the points, and the edges of the objects in the image from the front-right sensor 706 can be identified based on light discontinuities in the image. When the point cloud data is projected into the image, the edges of the point cloud data and the edges of the image should align with similar features. Based on differences in the edges, the AV can determine modification parameters that converge the edges from the point cloud data with the edges of the image, and then the AV can determine corresponding calibration parameters based on the modification parameters applied to at least one of the point cloud data from the LIDAR sensor 704 and the images from the front-right sensor 706.

In some aspects, a LIDAR sensor and a radar can also be used to perform various calibrations. The LIDAR produces 3D point cloud data that represent distances to objects, and radar provides a top-down perspective distance map that identifies a location of an object relative to the radar. In some aspects, the 3D point cloud data can be used to perform a calibration by mapping the point cloud data into a two-dimensional (2D) form as described in patent application bearing Ser. No. 17/540,565, which is herein incorporated by reference. For example, one axis (e.g., height, or the Z plane) can be eliminated to yield a top-down perspective distance map that corresponds to the radar. Unique clusters of points can be identified in one of the distance maps, and that cluster of points can be used to search or corresponding features in the other distance map. In one aspect, a grid-based search can be performed to identify corresponding points. In other aspects, other searches such as a nearest neighbor can be used to identify corresponding points Once the corresponding points are found the relationship between the cloud point data and the radar distance map can be identified and a transfer function based on the detected points can be extrapolated. Calibration parameters can then be extracted based on the transfer function.

In some aspects, an IMU can be calibrated by estimating the grade of the road that the autonomous vehicle may be on. After determining the grade estimate of the road and/or a determined direction of gravity, the autonomous vehicle can then calibrate the sensors based on the road grade and/or the determined direction of gravity. For example, while performing a loop, the grade estimates can be calculated throughout and because the AV starts and ends at the same point and the grade of the traversed path can be imputed based on LIDAR sensor data.

FIG. 8 illustrates an example of a loop movement in an undefined training area that can be performed by an AV 800 for various sensor calibrations in accordance with some aspects. In the illustrative example of FIG. 8, the undefined training area is a parking lot, but the undefined training area can be any location where an AV can maneuver at low speed with suitable environmental objects for tracking and calibration.

A 'loop' as referred to herein denotes the concept that an AV will drive approximately over at least one point off its path that it has previously driven. A loop does not require any particular shape or distance.

In some aspects, a radar sensor can be used to calibrate a LIDAR sensor as described in patent application bearing Ser. No. 17/523,566, which is herein incorporated by reference. For example, an aggregated radar point cloud generated from different poses of the vehicle (e.g., the vehicle 300 of FIG. 3) may be to provide "crisp" target detections as possible (e.g., walls, targets, etc. may have reasonable noise levels) and data points with significant noise in aggregated radar point may need to be corrected or removed to prevent calibration errors. In some implementations, radar scans and a LIDAR map may be downsampled and modified to align the radar point cloud with LIDAR point cloud. For example, the z-signal may be unreliable as radar and LIDAR features may not match, partly due to elevation noise and the radar point cloud and the LIDAR point cloud can be normalized and then aligned to calibrate LIDAR based on radar.

As noted above, the calibration of the AV 800 can be performed in stages with simple calibrations and validations occurring first and progressively building complexity to improve sensor calibration at low speed. For example, the AV 800 initially performs a sensor validation while the AV 800 is stationary at an initial position 802. If the sensors of the AV 800 are invalid, the AV 800 will fail validation and will not proceed. If the sensor validation succeeds, the AV 800 may then perform a linear movement 804 that moves the AV 800 forward a fixed distance. If the sensor validation associated with the linear movement 804 succeeds, the AV 800 is configured to perform a non-linear movement 806 to continue validating the sensors and stops at location 808.

If the sensor validation during the non-linear movement 806 is successful, the AV 800 may be configured to perform a loop movement 810 that starts and ends at location 808 (or another suitable location). For example, at location 808, the AV 800 can select fixed references for the loop movement 810 and can use the start and end of the loop movement to calibrate the sensors. For example, at location 808, the AV 800 has a direct line of sight to different objects across a full 360° proximity such as a signpost 812 on the rear left side of the AV 800, a signpost 814 on the front left side of the AV 800, a light post on the front right side of the AV 800, and a signpost 818 on the rear right side of the AV 800.

The AV 800 can perform the loop movement 810 based on any suitable parameter, such as the AV can attempt to achieve a maximum speed before attempting to return to turn. In other aspects, the AV 800 can identify constraints such as a curb, indicating the road end, and determine to turn. In other aspects, the AV 800 may be instructed to travel a minimum distance within the undefined training area. The AV 800 may be configured to have waypoints to complete a predetermined loop as indicated by waypoint 820, waypoint 822, and waypoint 824. In other aspects, the waypoints can identify points that the AV must traverse over, but the identified points may not identify a clear loop and the AV 800 determines how to return to a starting point. Although FIG. 8 illustrates a circular loop, the loop can be as complex as needed and include both left and right turns, and can intersect previously traversed positions. For example, the AV 800 may perform a figure eight to allow sensor calibrations for left and right turns.

When the AV 800 completes a loop, the AV 800 can return to the initial position 802 or the location 808. At location 808, the AV 800 will be able to use the different objects and determine the convergence of the calibration and error tolerances. In some aspects, the AV 800 may perform another loop to validate the calibration of the sensors and perform any final calibration adjustments while in a controlled low-speed environment. After the AV 800 determines that the sensors are adequately calibrated, the AV 800 may determine that the AV 800 is suitable for open road conditions. In some aspects, the authorization of the AV 800 to traverse open roads may be provided by the AV 800 itself, but the final authorization can be performed by another service or by a person who reviews details of the calibration (e.g., a calibration report).

After authorization, the AV 800 may be configured to navigate to an open road or can be provided a location of an exit point of the undefined training area. In some aspects, the calibration of the AV can continue on the open road. An example process of calibrating the AV 800 on the open road is further described herein with reference to the method described in FIG. 10.

FIG. 9 illustrates an example method 900 for calibrating multiple sensors of an AV in an undefined training area in accordance with some aspects. Although the example method 900 depicts a particular sequence of operations, the sequence may be altered without departing from the scope of the present disclosure. For example, some of the operations depicted may be performed in parallel or in a different sequence that does not materially affect the function of the method 900. In other examples, different components of an example device or system that implements the method 900 may perform functions at substantially the same time or in a specific sequence. In some aspects, the method can be performed by an AV (e.g., AV 102) in whole or in part. In some cases, parts of the process can be offloaded to an offline system, such as a system that provides a minimum number of waypoints for the AV to navigate.

According to some examples, the method 900 begins based on positioning the AV in the undefined training area at block 902. The plurality of sensors of the AV are not calibrated for AV operation and the AV does not include a location reference to identify objects in the undefined training area.

According to some examples, the method 900 includes determining (e.g., by the AV), while the AV is stationary in the undefined training area, whether the AV is safe to move based on the plurality of sensors of the AV are operational and providing expected data at block 904. For example, the AV can determine that every sensor is operational. For example, the AV can compare first sensor data from the first sensor (e.g., a LIDAR, a radar, an image sensor, a wheel encoder) with second sensor data from the second sensor (e.g., a LIDAR, a radar, an image sensor) and identify a common feature associated with the first sensor data from the second sensor data. For example, the common feature can be a sign, a post, a lane marking, a business façade, an automobile, etc. The AV can determine that the first sensor and the second sensor are providing the expected data when the common feature aligns in the first sensor data and the second sensor data. For example, if a LIDAR detects an object 10 meters away, and a different LIDAR detects that same object at 30 meters away, one of the LIDARs would appear to be non-functional and the AV will not be able to pass calibration.

According to some examples, after determining that the sensors of the AV are operational and providing expected data, the AV may actuate the AV to perform the linear movement at block 906. Based on the linear movement, the AV can calibrate parameters associated with at least an initial sensor with initial calibrations based on sensor data measured by the initial sensor during a linear movement at block 908. As an example, the AV can calibrate the sensors by identifying a static object in the undefined training area using the initial sensor of the plurality of sensors and measuring a first movement distance to the static object before and after the linear movement using the initial sensor. The AV can determine a second movement distance using sensor data captured by a different sensor. For example, the AV may determine a second movement distance using sensor data captured by a different sensor and compare the first movement distance to the second movement distance. For example, the AV may compare the first movement distance to the second movement distance. In some aspects, the AV can perform various calibrations using a fixed reference and different measurements, such as calibrating the initial sensor and the different sensors based on the comparison. For example, the wheel encoder can be calibrated based on LIDAR measurements.

According to some examples, the method includes determining (e.g., by the AV) that the AV satisfies a requirement to traverse the AV in a non-linear path in an undefined training area based on calibration of the initial sensor at block 910. For example, the AV can determine that the AV can traverse a non-linear path based on successfully completing the linear movement and determining that the wheel encoder is within a specific tolerance.

After determining that the AV satisfies a requirement to traverse the AV in a non-linear path, the method includes actuating (e.g., by the AV) the AV to perform a non-linear movement that moves the AV in an untraversed area at block 912. In one example, the AV can activate the first sensor or the second sensor for identifying the movement of the AV during the non-linear movement at block 914. Based on the measurement movement, the AV can calibrate one of the first sensor and the second sensor based on sensor data measured by the first sensor and the second sensor during the non-linear movement at block 916. For example, using the techniques described above, a transfer function can be identified that aligns data from one sensor to another, and the calibration parameters of the sensors can be extracted based on the transfer function.

After the non-linear movement, the method includes determining whether the first sensor satisfies a requirement to traverse an undefined loop (e.g., non-linearly) based on the calibration of the first sensor and the second sensor at block 918.

When the AV satisfies the requirement to traverse the undefined loop, the AV can actuate the AV to perform a loop movement that moves the AV in a forward direction to complete a loop and return to a previously traversed location at block 920. While navigating the undefined loop, the AV may calibrate a first sensor and a second sensor of a plurality of sensors based on sensor data measured by the first sensor and the second sensor during the loop movement at block 922. The first sensor can be identical types (e.g., LIDAR-LIDAR) or different types (LIDAR-image sensor) with different modalities. After the AV has performed an initial loop, the AV can perform a supplemental loop movement that moves the AV in the forward direction to complete the loop and return to the previously traversed location to validate the sensor calibrations at block 924.

After performing the loop maneuvers, the AV may validate the AV capability based on sensor data captured by at least the first sensor of the second sensor during the supplemental loop movement to satisfy an open road requirement at block 926. After validating the AV capability, the AV is permitted to access open roads at block 928.

FIG. 10 illustrates an example method 1000 for open road calibration according to some aspects of the disclosure. Although the example method 1000 depicts a particular sequence of operations, the sequence may be altered without departing from the scope of the present disclosure. For example, some of the operations depicted may be performed in parallel or in a different sequence that does not materially affect the function of the method 1000. In other examples, different components of an example device or system that implements the method 1000 may perform functions at substantially the same time or in a specific sequence.

According to some examples, the method 1000 begins by instructing the AV to pilot itself in an undefined training area subject to at least one constraint at block 1002. In one aspect, the AV is instructed to pilot itself along a path until the AV has overlapped at least a portion of the path. At block 1004, the method includes, at a location at which the AV has overlapped at least the portion of the path, determining that first returns from a previous LIDAR scan overlaps with second returns from a subsequent LIDAR scan taken when the AV has overlapped the at least the portion of the path. For example, when an AV returns to a point that has previously been measured, the AV can use the first measurement and the second measurement to validate a calibration.

At block 1006, the method includes determining that the AV satisfies an open road requirement to navigate an open road when the first returns from the previous LIDAR scan overlaps with the second returns from the subsequent LIDAR scan. In one aspect, the AV can determine that the open road requirement is satisfied and, based on this determination, may transmit a message to a command and control server of the AV indicating that the AV satisfies the open road requirement.

In another aspect, the AV can transmit a message to a command and control server of the AV and the message may include calibration parameters associated with a plurality of sensors. In response, the command and control server can determine whether the AV satisfies an open road requirement and may transmit a message to the AV that authorizes the AV to operate on open roads. The message can include a list of prohibited maneuvers and the list of prohibited maneuvers that is determined by the command and control server based on the calibration parameters. The AV may not have sufficient data diversity by operating at low speeds in the undefined training area, and may need additional data to ensure the safe operation of the AV. Examples of prohibited maneuvers include limiting a maximum speed of the AV, preventing the AV from taking an unprotected turn, changing into particular lanes, preventing the AV from taking a turn at an uncommon intersection configuration, and so forth. In one aspect, the command and control server can determine the list of prohibited maneuvers based on the calibration parameters. In another aspect, the message includes driving parameters associated with the path, and the command and control server can authorize the AV to operate on open roads and determine the list of prohibited maneuvers based on the calibration parameters and the driving parameters. For example, if the AV is able to find a sufficient number of low speed unprotected left and right turns in the undefined training area, the AV may be configured to perform protected left turns and protected and unprotected right turns.

In another aspect, while navigating the open road, the method continues calibrating a first sensor based on measurements on the open road at block 1008. For example, the AV can continue to refine calibrations between various LIDAR sensors based on longer range objects at higher speed.

At block 1010, the method includes removing a maneuver from the list of prohibited maneuvers. The maneuvers can be removed for a number of reasons including sufficient data diversity, verified calibration of sensors, and specific road conditions that permit the AV to determine to perform the prohibited maneuver. For example, after satisfying a trigger, the AV can identify a maneuver that uses measurements performed by the first sensor after satisfying the trigger, and remove the maneuver. For example, the trigger may be operating at a minimum speed for a minimum time (e.g., 20 minutes) to ensure sufficient data diversity and can remove a maximum speed restriction. Illustrative examples of triggers include an amount of time that the AV has been navigating at a minimum speed, a number of unprotected turns that the AV has performed that satisfy a safety criteria, a number of protected turns that the AV has performed, and a number of lane changes based on proximity of adjacent cars.

In other aspects, the AV can transmit a message to the command and control server with sensor measurements or calibration adjustments and, in response to the message, receive a message from the command and control server identifying a maneuver to enable. The AV can then remove the maneuver to the list of prohibited maneuvers. For example, the sensor measurements can be radar data from the articulating radars and the command and control server can enable turns at intersections with multiple left turn or multiple right turns routes. In one aspect, the articulating radars can be used to monitor specific paths as the vehicle turns to improve safety.

At block 1012, the method includes adding a maneuver to a list of prohibited maneuvers. In some aspects, a maneuver can be prohibited based on calibration issues that are detected during operation. For example, at block 1010, the method can include transmitting a message to a command and control server with sensor measurements or calibration adjustments, receiving a message from the command and control server identifying a maneuver to prohibit, and adding the maneuver to the list of prohibited maneuvers. In one aspect, a sensor may become misaligned or inoperative due to external force being applied to the sensor (e.g., a collision) or an external event. For example, rain can interfere with a camera sensor and distort images and rain can affect reflection from some surfaces. In the event of these scenarios, the AV can prohibit specific maneuvers such as an unprotected left turn.

At block 1014, the method can include modifying a list of restricted maneuvers. The list of restricted maneuvers can include various maneuvers in which the AV may be permitted based on road conditions that are ideal for the maneuver. In some aspects, the command and control server can identify various maneuvers the AV can perform in specific road circumstances and may transmit a message to the AV to cause the AV to move a maneuver from the list of prohibited maneuvers into the list of restricted maneuvers. For example, at block 1014, the AV can, while navigating on the open road, identify a maneuver of the AV in the list of restricted maneuvers that is restricted based on road conditions, determine that the road conditions at a location permit the maneuver, and perform the maneuver while measuring the performance of the maneuver. For example, the AV may be configured to perform an unprotected left turn when there is a single vehicle approaching that is 400 meters away, and the AV can monitor the approaching vehicle and ensure that the move is completed before the approaching vehicle is 100 meters away. The AV can transmit the measurements to the command and control server, which determines if the AV performs the maneuver with satisfactory results. In response to the determination, the command and control server can send a message to the AV to remove the maneuver from the list of restricted maneuvers, or the command and control server can identify revised road conditions associated with the maneuver in the list of restricted maneuvers. In the event the command and control server revises the road conditions, the command and control server may transmit the revised road conditions to the AV and the AV may modify the maneuver in the list of restricted maneuvers. The command and control server can be configured to gradually gate various maneuvers and incrementally reduce safety margins to improve AV operation. In some aspects, the command and control server can also increase safety margins based on measured maneuvers.

In some aspects, the method can include prohibiting a maneuver based on calibration verifications in the environment at block 1016. For example, at block 1016, the AV can measure an object in an environment at different times across with different sensors, transmit measurements of the object to a command and control server, receive a message from the command and control server with a maneuver to prohibit, and add the maneuver to the list of prohibited maneuvers. In this example, the command and control server determines an issue associated with a calibration based on measurements of an object and different times. For example, an AV may be approaching a landmark and the AV of the command and control server can identify a discrepancy in a calibration based on odometry using the landmark as a reference. In some aspects, the AV can add the identified maneuver to the list of restricted maneuvers. For example, based on a miscalibration that causes a slight deviation in odometry measurements, the AV may be restricted to a maximum speed based on the number of pedestrians within the environment. In other examples, the AV can identify maneuvers to prohibit based on calibration verifications in the environment at block 1016.

In another aspect, the method can include dynamically modifying sensor priorities at block 1018. In some cases, sensor priority can be weighted for various measurements and, based on various factors, the weights can be changed based on various factors. One example of a factor is weather, which can affect sensor measurements based on a number of factors. For example, in the case of extremely heavy rain, the radar sensors and the ToF sensors can be weighted greater than LIDAR sensors and image sensors because rain can affect image sensors and LIDAR sensors. In some aspects, the AV can autonomously determine the sensor priorities based on sensed information, of the AV receive the sensor priorities from the command and control server. Based on the modified sensor priorities, the AV can dynamically add and remove various maneuvers into the list of restricted maneuvers or the list of prohibited maneuvers. In other cases, the AV can identify various factors such as neighboring traffic has significantly deviated based on the conditions and the AV can impose constraints based on the shifted environmental conditions or traffic conditions.

Figure 11:
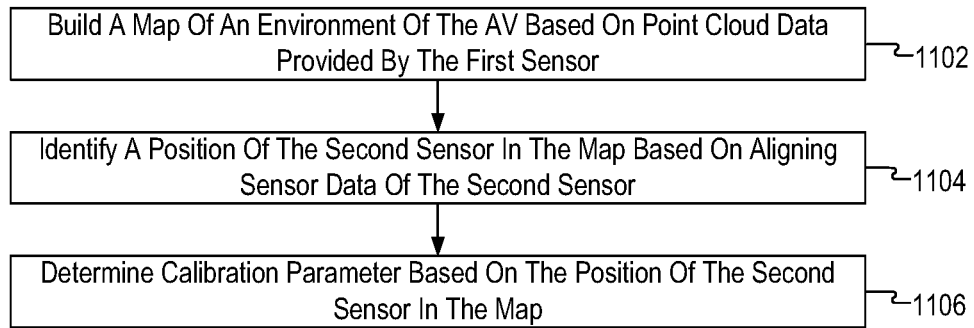
FIG. 11 illustrates an example method for performing a calibration of multiple sensors based on a distance detecting sensor according to some aspects of the disclosure.

FIG. 11 illustrates an example method 1100 for performing a calibration of multiple sensors based on a distance detecting sensor according to some aspects of the disclosure. In some aspects, the method 1100 can be performed by the AV during the various calibration processes described above and the method can be performed multiple times based on changes that promulgate from various calibration settings in related sensors.

At block 1102, the AV may build a map of an environment of the AV based on point cloud data provided by the LIDAR sensor, and the map may be based on a number of frames that are aligned in space and time. At block 1104, the AV may identify a position of the second sensor in the map based on aligning sensor data of the second sensor with timestamps from sensor data of the first sensor. For example, an iterative clustering point (ICP) algorithm can be used to identify common clusters of points to align the different sensor data in space and time. Based on the alignment of the sensor data, the AV may determine a calibration parameter based on the position of the second sensor in the map at block 1106. In some aspects, the first sensor and the second sensor provide distance information or time of flight information. For example, the first sensor could be a LIDAR sensor and the second sensor could be a ToF sensor or a LIDAR sensor. In one aspect, the second sensor could be a radar sensor.

Figure 12:
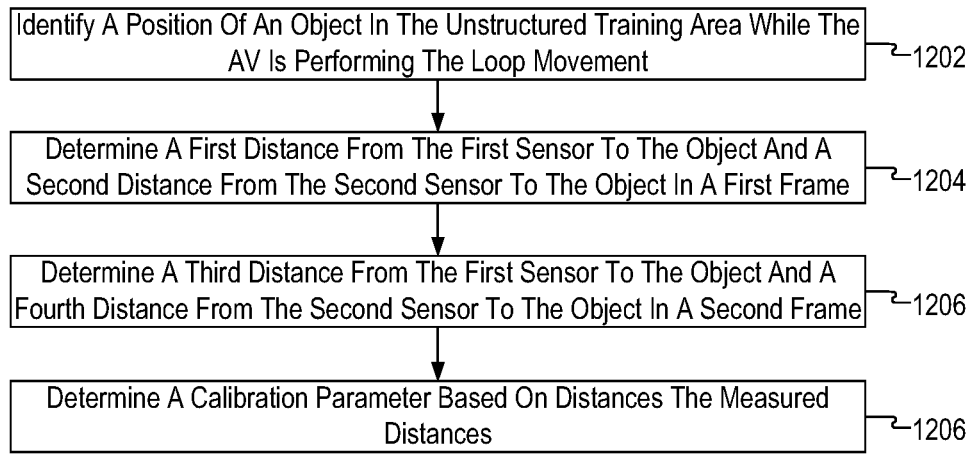
FIG. 12 illustrates another example method for performing a calibration of multiple sensors based on a distance detecting sensor according to some aspects of the disclosure.

FIG. 12 illustrates another example method 1200 for performing a calibration of multiple sensors based on a distance detecting sensor according to some aspects of the disclosure. In some aspects, the method 1200 can be performed by the AV during the various calibration processes described above and the method can be performed multiple times based on changes that promulgate from various calibration settings in related sensors.

At block 1202, the AV may identify a position of an object in the undefined training area while the AV is performing a movement. The object can be a static object in the environment that is detectable using the various sensors. At block 1204, the AV may determine a first distance from the first sensor to the object and a second distance from the second sensor to the object in a first frame. In some aspects, the first sensor and the second sensor may be located at different points and the measurement will be different. At block 1206, the AV may determine a third distance from the first sensor to the object and a fourth distance from the second sensor to the object in a second frame. In some aspects, more accurate calibrations are possible when the time frame and the second frame have sufficient data diversity, such as a long turn. At block 1208, the AV may determine a calibration parameter based on the distances the first sensor and the second sensor travels between the first frame and the second frame. For example, the AV can determine the movement of the first sensor and a different movement of the second sensor (e.g., due to a longer radius).

Based on the motion, the AV can identify a transfer function between the two extrapolated distances and that transfer function can be used to generate calibration parameters for the first sensor and the second sensor. In some aspects, the first sensor and the second sensor provide distance information or time of flight information. For example, the first sensor could be a LIDAR sensor and the second sensor could be a ToF sensor or a LIDAR sensor. In one aspect, the second sensor could be a radar sensor.

Figure 13:
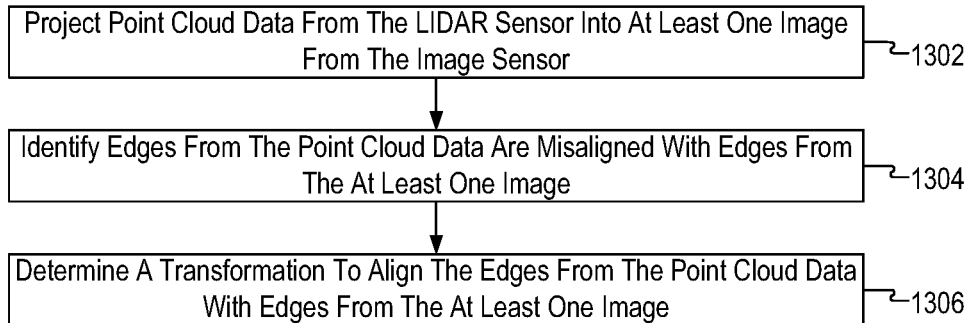
FIG. 13 illustrates another example method for performing a calibration of multiple sensors according to some aspects of the disclosure.

FIG. 13 illustrates another example method 1300 for performing a calibration of multiple sensors according to some aspects of the disclosure. In some aspects, the method 1300 can be performed by the AV during the various calibration processes described above and the method can be performed multiple times based on changes that promulgate from various calibration settings in related sensors.

In some aspects, the method 1300 calibrates sensors that provide time of flight or distance information (e.g., LIDAR) with sensors that provide images (e.g., an image sensor, a thermal sensor). At block 1302, the AV may project point cloud data from the LIDAR sensor into at least one image from the image sensor. For example, the AV may be provided some seed information that identifies an approximate location of the LIDAR with respect to the image sensor (e.g., information provided during design time). Using the seed information, the AV can project the point cloud data into the image. At block 1304, the AV can identify edges from the point cloud data that are misaligned with edges from the at least one image. The edges from the point cloud data are identified based on a depth discontinuity in the point cloud data and edges from the at least one image are identified based on a light intensity discontinuity. Based on the identified edges, at block 1306, the AV can determine a transformation to align the edges from the point cloud data with edges from the at least one image, and that transformation can then be mapped into calibration parameters that cause the image data to align with the point cloud data.

Figure 14:
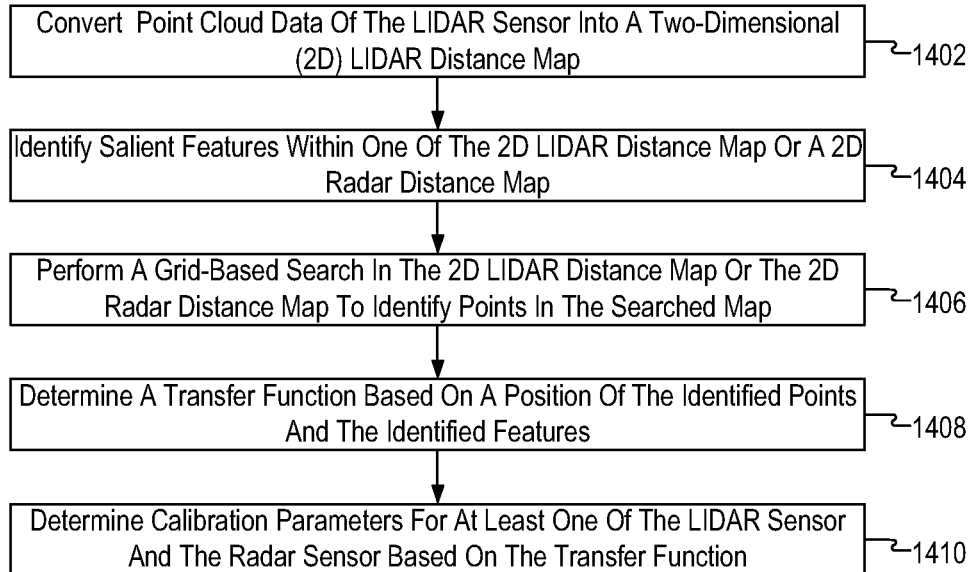
FIG. 14 illustrates another example method for performing a calibration of multiple sensors according to some aspects of the disclosure.
Figure 15:
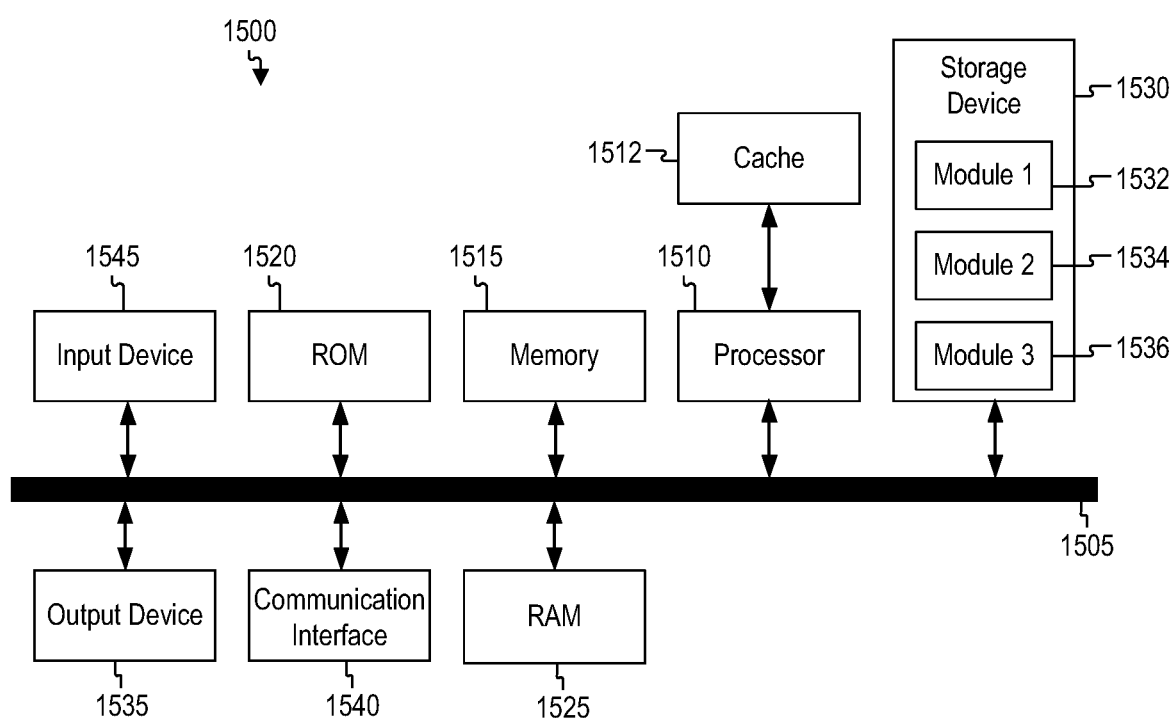
FIG. 15 illustrates an example of a computing system according to an example of the instant disclosure.

FIG. 14 illustrates another example method 1400 for performing a calibration of multiple sensors according to some aspects of the disclosure. In some aspects, the method 1400 can be performed by the AV during the various calibration processes described above and the method can be performed multiple times based on changes that promulgate from various calibration settings in related sensors. In one aspect, the method 1400 can be performed with a first sensor that provides ToF or distance information (e.g., LIDAR, ToF) with respect to a radar.

At block 1402, the AV can convert point cloud data of the LIDAR sensor into a 2D LIDAR distance map. In some aspects, the point cloud data is converted into a 2D top-down perspective map of data points that do not include height information, which the radar also produces. At block 1404, the AV may identify salient features within one of the 2D LIDAR distance map or a 2D radar distance map, and the salient features should be identifiable in the other distance map. At block 1406, the AV may perform a search in the 2D LIDAR distance map or the 2D radar distance map to identify points in the searched map that correspond to the identified features. For example, the search may be based on a grid, a nearest neighbor, or other types of algorithms. At block 1408, after identifying the points, the AV may determine a transfer function based on a position of the identified points and the identified features. At block 1410, the AV can determine calibration parameters for at least one of the LIDAR sensor and the radar sensor based on the transfer function.

FIG. 15 shows an example of computing system 1500, which can be for example any computing device for training or executing a neural network, or any component thereof in which the components of the system are in communication with each other using connection 1505. Connection 1505 can be a physical connection via a bus, or a direct connection into processor 1510, such as in a chipset architecture. Connection 1505 can also be a virtual connection, networked connection, or logical connection.

In some embodiments, computing system 1500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 1500 includes at least one processing unit (a central processing unit (CPU) or processor) 1510 and connection 1505 that couples various system components including system memory 1515, such as read-only memory (ROM) 1520 and random access memory (RAM) 1525 to processor 1510. Computing system 1500 can include a cache of high-speed memory 1512 connected directly with, in close proximity to, or integrated as part of processor 1510.

Processor 1510 can include any general purpose processor and a hardware service or software service, such as services 1532, 1534, and 1536 stored in storage device 1530, configured to control processor 1510 as well as a special-purpose processor where software instructions are incorporated into the actual processor design. Processor 1510 may essentially be a completely self-contained computing system, containing multiple cores or processors, a bus, memory controller, cache, etc. A multi-core processor may be symmetric or asymmetric.

To enable user interaction, computing system 1500 includes an input device 1545, which can represent any number of input mechanisms, such as a microphone for speech, a touch-sensitive screen for gesture or graphical input, keyboard, mouse, motion input, speech, etc. Computing system 1500 can also include output device 1535, which can be one or more of a number of output mechanisms known to those of skill in the art. In some instances, multimodal systems can enable a user to provide multiple types of input/output to communicate with computing system 1500. Computing system 1500 can include communications interface 1540, which can generally govern and manage the user input and system output. There is no restriction on operating on any particular hardware arrangement, and therefore the basic features here may easily be substituted for improved hardware or firmware arrangements as they are developed.

Storage device 1530 can be a non-volatile memory device and can be a hard disk or other types of computer readable media which can store data that are accessible by a computer, such as magnetic cassettes, flash memory cards, solid state memory devices, digital versatile disks, cartridges, RAMs, ROM, and/or some combination of these devices.

The storage device 1530 can include software services, servers, services, etc., that when the code that defines such software is executed by the processor 1510, it causes the system to perform a function. In some embodiments, a hardware service that performs a particular function can include the software component stored in a computer-readable medium in connection with the necessary hardware components, such as processor 1510, connection 1505, output device 1535, etc., to carry out the function.

The computing system 1500 can also include a graphical processing unit (GPU) array 1550 or any similar processor for performing massively complex and parallel mathematical operations such as simulations, games, neural network training, and so forth. The GPU array 1550 includes at least one GPU and is illustrated to have three GPUs comprising GPU 1552, GPU 1554, and GPU 1556. However, the GPU array 1550 can be any number of GPUs. In some examples, the GPU core can be integrated into a die of the processor 1510.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Illustrative examples of the disclosure include:

Aspect 1. A method of calibrating an AV in an undefined environment, the method comprising: instructing the AV to pilot itself in an undefined training area subject to at least one constraint, wherein the AV is instructed to pilot itself along a path until the AV has overlapped at least a portion of the path; and at a location at which the AV has overlapped at least the portion of the path, determining that first returns from a previous LIDAR scan overlaps with second returns from a subsequent LIDAR scan taken when the AV has overlapped at least the portion of the path.

Aspect 2. The method of Aspect 1, wherein the AV does not include a location reference to identify locations of existing objects in the undefined training area and a plurality of sensors of the AV are uncalibrated with respect to each other.

Aspect 3. The method of any of Aspects 1 to 2, further comprising: while the AV is stationary in the undefined training area, determining whether the AV is safe to move based on the plurality of sensors of the AV are operational and providing expected data.

Aspect 4. The method of any of Aspects 1 to 3, wherein the determining of the plurality of sensors of the AV are providing the expected data comprises: comparing first sensor data from a first sensor with second sensor data from a second sensor; identifying a common feature represented in the first sensor data and the second sensor data; and determining that a position of the common feature in the first sensor data corresponds to a position of the common feature in the second sensor data.

Aspect 5. The method of any of Aspects 1 to 4, further comprising: after determining the AV is safe to move, instructing the AV to traverse a linear path in the undefined training area; and calibrating an initial sensor of the plurality of sensors based on sensor data measured by the initial sensor during the traversal of the linear path.

Aspect 6. The method of any of Aspects 1 to 5, wherein calibrating parameters associated with at least the initial sensor comprises: identifying features of a static object in the undefined training area using the initial sensor of the plurality of sensors; and measuring a first odometry relative to the static object before and after traversal of the linear path using the initial sensor.

Aspect 7. The method of any of Aspects 1 to 6, further comprising: determining a second odometry using sensor data captured by a different sensor; comparing the first odometry to the second odometry, and calibrating the initial sensor and the different sensor based on the comparison of the first odometry to the second odometry.

Aspect 8. The method of any of Aspects 1 to 7, further comprising: when the AV successfully traverses the linear path, instructing the AV to traverse a non-linear path in the undefined training area; and calibrating the first sensor and the second sensor of the plurality of sensors based on sensor data measured by the first sensor and the second sensor during traversal of the non-linear path.

Aspect 9. The method of any of Aspects 1 to 8, wherein, after the AV successfully traverses the non-linear path, the AV is instructed to pilot itself until the AV has overlapped at least the portion of the path.

Aspect 10. The method of any of Aspects 1 to 9, wherein the first sensor comprises a LIDAR sensor and the second sensor comprises one of a LIDAR sensor, a radar sensor, and a ToF sensor.

Aspect 11. The method of any of Aspects 1 to 10, wherein the AV determines the path from a current position to the previously traversed location and autonomously moves along the path in the undefined training area.

Aspect 12. The method of any of Aspects 1 to 11, further comprising calibrating a first sensor or a second sensor of the plurality of sensors based on sensor data measured by the first sensor and the second sensor during piloting of the AV until the AV has overlapped at least a portion of the path.

Aspect 13. The method of any of Aspects 1 to 12, wherein calibrating the first sensor or the second sensor comprises: identifying a position of an object in the undefined training area while the AV is traversing the undefined training area; determine a first distance from the first sensor to the object and a second distance from the second sensor to the object in a first frame; determine a third distance from the first sensor to the object and a fourth distance from the second sensor to the object in a second frame; and determining a calibration parameter based on distances the first sensor and the second sensor travels between the first frame and the second frame or based on different objects within the first frame.

Aspect 14. The method of any of Aspects 1 to 13, wherein the first sensor comprises a LIDAR sensor and the second sensor comprises one of a LIDAR sensor and a ToF sensor.

Aspect 15. The method of any of Aspects 1 to 14, wherein the first sensor comprises a LIDAR sensor and the second sensor comprises an image sensor, and wherein calibrating the first sensor and the second sensor based on sensor data measured by the first sensor and the second sensor comprises: projecting point cloud data from the LIDAR sensor into at least one image from the image sensor; identifying edges from the point cloud data are misaligned with edges from the at least one image, wherein the edges from the point cloud data are identified based on a depth discontinuity in the point cloud data and edges from the at least one image are identified based on a light intensity discontinuity; and determining a transformation to align the edges from the point cloud data with edges from the at least one image.

Aspect 16. The method of any of Aspects 1 to 15, wherein the first sensor comprises a first image sensor and the second sensor comprises a second image sensor.

Aspect 17. The method of any of Aspects 1 to 16, wherein the first sensor comprises a LIDAR sensor and the second sensor comprises a radar sensor, and wherein calibrating the first sensor and the second sensor based on sensor data measured by the first sensor and the second sensor comprises: converting point cloud data of the LIDAR sensor into a 2D LIDAR distance map; identifying features from the 2D LIDAR distance map or a 2D radar distance map to search for; searching the 2D LIDAR distance map or the 2D radar distance map to identify points that correspond to the identified features; determining a transfer function based on a position of the identified points and the identified features; and determining calibration parameters for at least one of the LIDAR sensor and the radar sensor based on the transfer function.

Aspect 18. The method of any of Aspects 1 to 17, further comprising: comparing data from an IMU at two different locations along the path to determine IMU calibration parameters to correspond to measurements associated with LIDAR return data; and configuring the IMU with the calibration parameters.

Aspect 19. The method of any of Aspects 1 to 18, further comprising: while driving the path, correlating an object or features of the object perceivable in LIDAR return data with an object or features of the object perceivable in a visual camera image from an image sensor; determining a calibration parameter based on a difference between the LIDAR return data and the visual camera image; and determining a calibration offset associated with the visual camera image.

Aspect 20. The method of any of Aspects 1 to 19, further comprising: After the AV has returned to the location, comparing the first returns from the previous LIDAR scan with the second returns from the subsequent LIDAR scan taken, wherein the first returns and the second returns are corrected by a first calibration parameters of the AV at the location; and determining a calibration confidence of the first calibration parameters based on the comparison of the first returns and the second returns.

Aspect 21. The method of any of Aspects 1 to 20, further comprising: instructing the AV to perform a second traversal of the path using the first calibration parameters; after the second traversal, comparing third returns of the second traversal of the path with the second returns from the subsequent LIDAR scan; and validating the first calibration parameters based on determining that locations of objects within the second returns correspond to locations of the objects in the third returns.

Aspect 22. The method of any of Aspects 1 to 21, wherein the AV is provided waypoints that identify at least a portion of the path within the undefined training area.

Aspect 23. The method of any of Aspects 1 to 22, wherein the undefined training area is located in a parking lot.

Aspect 24: An AV includes a storage (implemented in circuitry) configured to store instructions; and electric drivetrain configured to move the AV; and a processor. The processor configured to execute the instructions and cause the processor to: instruct the AV to pilot itself in an undefined training area subject to at least one constraint, wherein the AV is instructed to pilot itself along a path until the AV has overlapped at least a portion of the path; and at a location at which the AV has overlapped at least the portion of the path, determine that first returns from a previous LIDAR scan overlaps with second returns from a subsequent LIDAR scan taken when the AV has overlapped at least the portion of the path.

Aspect 25: The AV of Aspect 24, wherein the AV does not include a location reference to identify locations of existing objects in the undefined training area and a plurality of sensors of the AV are uncalibrated with respect to each other.

Aspect 26: The AV of any of Aspects 24 to 25, wherein while the AV is stationary in the undefined training area, determine whether the AV is safe to move based on the plurality of sensors of the AV are operational and providing expected data.

Aspect 27: The AV of any of Aspects 24 to 26, wherein the processor is configured to execute the instructions and cause the processor to: compare first sensor data from a first sensor with second sensor data from a second sensor; identify a common feature represented in the first sensor data and the second sensor data; and determine that a position of the common feature in the first sensor data corresponds to a position of the common feature in the second sensor data.

Aspect 28: The AV of any of Aspects 24 to 27, wherein the processor is configured to execute the instructions and cause the processor to: when the AV successfully traverses the linear path, instruct the AV to traverse a linear path in the undefined training area; and calibrate an initial sensor of the plurality of sensors based on sensor data measured by the initial sensor during the traversal of the linear path.

Aspect 29: The AV of any of Aspects 24 to 28, wherein the processor is configured to execute the instructions and cause the processor to: identify features of a static object in the undefined training area using the initial sensor of the plurality of sensors; and measure a first odometry relative to the static object before and after traversal of the linear path using the initial sensor.

Aspect 30: The AV of any of Aspects 24 to 29, wherein the processor is configured to execute the instructions and cause the processor to: determine a second odometry using sensor data captured by a different sensor; compare the first odometry to the second odometry, and calibrate the initial sensor and the different sensor based on the comparison of the first odometry to the second odometry.

Aspect 31: The AV of any of Aspects 24 to 30, wherein the processor is configured to execute the instructions and cause the processor to: when the AV successfully traverses the linear path, instruct the AV to traverse a non-linear path in the undefined training area; and calibrate the first sensor and the second sensor of the plurality of sensors based on sensor data measured by the first sensor and the second sensor during traversal of the non-linear path.

Aspect 32: The AV of any of Aspects 24 to 31, wherein the processor is configured to execute the instructions and cause the processor to:

Aspect 33: The AV of any of Aspects 24 to 32, wherein the first sensor comprises a LIDAR sensor and the second sensor comprises one of a LIDAR sensor, a radar sensor, and a ToF sensor.

Aspect 34: The AV of any of Aspects 24 to 33, wherein the AV determines the path from a current position to the previously traversed location and autonomously moves along the path in the undefined training area.

Aspect 35: The AV of any of Aspects 24 to 34, wherein the processor is configured to execute the instructions and cause the processor to: calibrate a first sensor or a second sensor of the plurality of sensors based on sensor data measured by the first sensor and the second sensor during piloting of the AV until the AV has overlapped at least a portion of the path.

Aspect 36: The AV of any of Aspects 24 to 35, wherein the processor is configured to execute the instructions and cause the processor to: identify a position of an object in the undefined training area while the AV is traversing the undefined training area; determine a first distance from the first sensor to the object and a second distance from the second sensor to the object in a first frame; determine a third distance from the first sensor to the object and a fourth distance from the second sensor to the object in a second frame; and determine a calibration parameter based on distances the first sensor and the second sensor travels between the first frame and the second frame or based on different objects within the first frame.

Aspect 37: The AV of any of Aspects 24 to 36, wherein the first sensor comprises a LIDAR sensor and the second sensor comprises one of a LIDAR sensor and a ToF sensor.

Aspect 38: The AV of any of Aspects 24 to 37, wherein the first sensor comprises a LIDAR sensor and the second sensor comprises an image sensor, and wherein calibrating the first sensor and the second sensor based on sensor data measured by the first sensor and the second sensor comprises: project point cloud data from the LIDAR sensor into at least one image from the image sensor; identify edges from the point cloud data are misaligned with edges from the at least one image, wherein the edges from the point cloud data are identified based on a depth discontinuity in the point cloud data and edges from the at least one image are identified based on a light intensity discontinuity; and determine a transformation to align the edges from the point cloud data with edges from the at least one image.

Aspect 39: The AV of any of Aspects 24 to 38, wherein the first sensor comprises a first image sensor and the second sensor comprises a second image sensor.

Aspect 40: The AV of any of Aspects 24 to 39, wherein the first sensor comprises a LIDAR sensor and the second sensor comprises a radar sensor, and wherein calibrating the first sensor and the second sensor based on sensor data measured by the first sensor and the second sensor comprises: convert point cloud data of the LIDAR sensor into a 2D LIDAR distance map; identify features from the 2D LIDAR distance map or a 2D radar distance map to search for; search the 2D LIDAR distance map or the 2D radar distance map to identify points that correspond to the identified features; determine a transfer function based on a position of the identified points and the identified features; and determine calibration parameters for at least one of the LIDAR sensor and the radar sensor based on the transfer function.

Aspect 41: The AV of any of Aspects 24 to 40, wherein the processor is configured to execute the instructions and cause the processor to: compare data from an IMU at two different locations along the path to determine IMU calibration parameters to correspond to measurements associated with LIDAR return data; and configure the IMU with the calibration parameters.

Aspect 42: The AV of any of Aspects 24 to 41, wherein the processor is configured to execute the instructions and cause the processor to: correlate an object or features of the object perceivable in LIDAR return data with an object or features of the object perceivable in a visual camera image from an image sensor; determine a calibration parameter based on a difference between the LIDAR return data and the visual camera image; and determine a calibration offset associated with the visual camera image.

Aspect 43: The AV of any of Aspects 24 to 42, wherein after the AV has returned to the location, compare the first returns from the previous LIDAR scan with the second returns from the subsequent LIDAR scan taken, wherein the first returns and the second returns are corrected by a first calibration parameters of the AV at the location; and determine a calibration confidence of the first calibration parameters based on the comparison of the first returns and the second returns.

Aspect 44: The AV of any of Aspects 24 to 43, wherein the processor is configured to execute the instructions and cause the processor to: instruct the AV to perform a second traversal of the path using the first calibration parameters; after the second traversal, compare third returns of the second traversal of the path with the second returns from the subsequent LIDAR scan; and validate the first calibration parameters based on determining that locations of objects within the second returns correspond to locations of the objects in the third returns.

Aspect 45: The AV of any of Aspects 24 to 44, wherein the AV is provided waypoints that identify at least a portion of the path within the undefined training area.

Aspect 46: The AV of any of Aspects 24 to 45, wherein the undefined training area is located in a parking lot.

What is claimed is:

1. A method of calibrating an autonomous vehicle (AV) in an undefined environment, the method comprising:
    controlling the AV to pilot itself in an undefined training area subject to at least one constraint, wherein the undefined training area includes at least one undefined feature and wherein the AV is instructed to pilot itself along a path until the AV has overlapped at least a portion of the path, wherein the AV pilots itself through the undefined training area without reference to any previously stored map data, GNSS landmark database, or external calibration target and the at the path is autonomously generated by the AV;
    at a location at which the AV has overlapped at least the portion of the path, determining that first returns from a previous LIDAR scan overlaps with second returns from a subsequent LIDAR scan taken when the AV has overlapped at least the portion of the path, wherein determining the overlap comprises:
    identifying objects in the environment that were identified before performing a loop movement and identifying those objects after performing the loop movement to determine whether any of the objects are in different locations;
    using multiple objects to triangulate a position of the AV and determine distances to the objects within the environment; and
    validating calibration of various sensors based on comparing initial sensor measurements at the location before the loop movement with subsequent sensor measurements after returning to the location; and
    executing, a three-dimensional point-cloud registration algorithm that aligns the first returns and the second returns using an iterative closest point (ICP) method to generate a six-degree-of-freedom (6-DOF) transform between the scans, and computing a root-mean-square (RMS) error between the aligned point clouds, wherein calibration is validated only when the RMS error is below a predetermined threshold of less than 5 centimeters; and
    based on a determination that the first returns from the previous LIDAR scan overlaps with second returns from the subsequent LIDAR scan, determining that the AV satisfies an open road requirement to navigate an open road.

2. The method of claim 1, further comprising:
    while the AV is stationary in the undefined training area, determining whether the AV is safe to move based on a determination that a plurality of sensors of the AV are operational and providing expected data.

3. The method of claim 2, wherein the determining of the plurality of sensors of the AV are providing the expected data comprises:
    comparing first sensor data from a first sensor with second sensor data from a second sensor;

identifying a common feature represented in the first sensor data and the second sensor data; and determining that a position of the common feature in the first sensor data corresponds to a position of the common feature in the second sensor data.

4. The method of claim 3, further comprising:

after determining the AV is safe to move, instructing the AV to traverse a linear path in the undefined training area; and calibrating an initial sensor of the plurality of sensors based on sensor data measured by the initial sensor during the traversal of the linear path.

5. The method of claim 4, wherein calibrating parameters associated with at least the initial sensor comprises:

identifying features of a static object in the undefined training area using the initial sensor of the plurality of sensors; and measuring a first odometry relative to the static object before and after traversal of the linear path using the initial sensor.

6. The method of claim 5, further comprising:

determining a second odometry using sensor data captured by a different sensor;

comparing the first odometry to the second odometry, and calibrating the initial sensor and the different sensor based on the comparison of the first odometry to the second odometry.

7. The method of claim 4, further comprising:

when the AV successfully traverses the linear path, instructing the AV to traverse a non-linear path in the undefined training area; and calibrating the first sensor and the second sensor of the plurality of sensors based on sensor data measured by the first sensor and the second sensor during traversal of the non-linear path.

8. The method of claim 7, wherein, after the AV successfully traverses the non-linear path, the AV is instructed to pilot itself until the AV has overlapped at least the portion of the path.

9. The method of claim 8, wherein the first sensor comprises a first light detection and ranging (LIDAR) sensor and the second sensor comprises one of a second LIDAR sensor, a radar sensor, and a time-of-flight (ToF) sensor.

10. The method of claim 1, wherein the AV determines the path from a current position to the location and autonomously moves along the path in the undefined training area.

11. The method of claim 1, wherein the AV is provided waypoints that identify at least a portion of the path within the undefined training area.

12. The method of claim 1, wherein the undefined training area is located in a parking lot.

13. An autonomous vehicle (AV) comprising:

a storage configured to store instructions;

an electric drive train configured to move the AV;

a processor configured to execute the instructions and cause the processor to:

control the AV to pilot itself in an undefined training area subject to at least one constraint, wherein the undefined training area includes at least one undefined feature and wherein the AV is instructed to pilot itself along a path until the AV has overlapped at least a portion of the path, wherein the AV pilots itself through the undefined training area without reference to any previously stored map data, GNSS landmark database, or external calibration target and the at the path is autonomously generated by the AV;

at a location at which the AV has overlapped at least the portion of the path, determine that first returns from a previous LIDAR scan overlaps with second returns from a subsequent LIDAR scan taken when the AV has overlapped at least the portion of the path, wherein determining the overlap comprises:

identifying objects in the environment that were identified before performing a loop movement and identifying those objects after performing the loop movement to determine whether any of the objects are in different locations;

using multiple objects to triangulate a position of the AV and determine distances to the objects within the environment; and validating calibration of various sensors based on comparing initial sensor measurements at the location before the loop movement with subsequent sensor measurements after returning to the location; and executing, a three-dimensional point-cloud registration algorithm that aligns the first returns and the second returns using an iterative closest point (ICP) method to generate a six-degree-of-freedom (6-DOF) transform between the scans, and computing a root-mean-square (RMS) error between the aligned point clouds, wherein calibration is validated only when the RMS error is below a predetermined threshold of less than 5 centimeters; and based on a determination that the first returns from the previous LIDAR scan overlaps with second returns from the subsequent LIDAR scan, determining that the AV satisfies an open road requirement to navigate an open road.

14. The AV of claim 13, wherein the AV does not include a location reference to identify locations of existing objects in the undefined training area and a plurality of sensors of the AV are uncalibrated with respect to each other.

15. The AV of claim 14, wherein while the AV is stationary in the undefined training area, determine whether the AV is safe to move based on the plurality of sensors of the AV are operational and providing expected data.

16. The AV of claim 15, wherein the processor is configured to execute the instructions and cause the processor to:

compare first sensor data from a first sensor with second sensor data from a second sensor;

identify a common feature represented in the first sensor data and the second sensor data; and determining that a position of the common feature in the first sensor data corresponds to a position of the common feature in the second sensor data.

17. The AV of claim 16, wherein the processor is configured to execute the instructions and cause the processor to:

when the AV successfully traverses the path, instruct the AV to traverse a linear path in the undefined training area; and calibrate an initial sensor of the plurality of sensors based on sensor data measured by the initial sensor during the traversal of the linear path.

18. The AV of claim 17, wherein the processor is configured to execute the instructions and cause the processor to:

identify features of a static object in the undefined training area using the initial sensor of the plurality of sensors; and measure a first odometry relative to the static object before and after traversal of the linear path using the initial sensor.

19. The autonomous vehicle of claim 18, wherein the processor is configured to execute the instructions and cause the processor to:
  determine a second odometry using sensor data captured by a different sensor;
  compare the first odometry to the second odometry, and
  calibrate the initial sensor and the different sensor based on the comparison of the first odometry to the second odometry.

\* \* \* \* \*